(12) United States Patent
Furuya et al.

(10) Patent No.: US 8,350,789 B2
(45) Date of Patent: Jan. 8, 2013

(54) IMAGE DISPLAY APPARATUS

(75) Inventors: Hiroyuki Furuya, Nara (JP); Kiminori Mizuuchi, Osaka (JP); Toshifumi Yokoyama, Osaka (JP); Tatsuo Itoh, Osaka (JP); Akira Kurozuka, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1453 days.

(21) Appl. No.: 11/783,693

(22) Filed: Apr. 11, 2007

(65) Prior Publication Data

US 2007/0252918 A1 Nov. 1, 2007

(30) Foreign Application Priority Data

Apr. 12, 2006 (JP) .................................. 2006-109491
Nov. 14, 2006 (JP) .................................. 2006-307427

(51) Int. Cl.
*G09G 3/34* (2006.01)
(52) U.S. Cl. ............... 345/84; 345/88; 345/690; 345/83; 349/7; 349/8; 349/5; 348/744; 348/751; 348/761; 348/766; 353/31; 353/33; 353/34; 353/37
(58) Field of Classification Search .................... 345/84, 345/88, 690, 83; 353/31, 33, 34, 37, 122; 349/22, 5, 7–8; 348/751, 761, 766, 790, 348/744
See application file for complete search history.

(56) References Cited

U.S. PATENT DOCUMENTS

| 3,818,129 | A | 6/1974 | Yamamoto |
| 5,255,082 | A | 10/1993 | Tamada |
| 5,506,597 | A | 4/1996 | Thompson et al. |
| 5,537,258 | A | 7/1996 | Yamazaki et al. |
| 6,183,092 | B1 * | 2/2001 | Troyer ............................ 353/31 |
| 6,594,090 | B2 * | 7/2003 | Kruschwitz et al. .......... 359/707 |
| 6,910,774 | B2 * | 6/2005 | Troyer ............................ 353/31 |
| 2006/0268241 | A1 * | 11/2006 | Watson et al. .................. 353/94 |
| 2007/0058135 | A1 * | 3/2007 | Morikawa et al. .............. 353/30 |

FOREIGN PATENT DOCUMENTS

| JP | 5-150209 | 6/1993 |
| JP | 5-210082 | 8/1993 |
| JP | 2005-352172 | 12/2005 |
| WO | WO 2005098532 A1 * | 10/2005 |

* cited by examiner

*Primary Examiner* — Lun-Yi Lao
*Assistant Examiner* — Olga Merkoulova
(74) *Attorney, Agent, or Firm* — Wenderoth, Lind & Ponack, L.L.P.

(57) ABSTRACT

A 2D image display apparatus using a laser light source. By controlling the timing of a scan by a beam scan portion in response to the characteristic of a laser light source and by setting a light emitting time of the laser light source to an integral multiple of a scan cycle of the beam scan portion, it is possible to illuminate a spatial light modulator homogeneously with a laser beam. It is thus possible to display an image at high accuracy without causing a bright line, irregularities in brightness, and contrast deterioration.

24 Claims, 28 Drawing Sheets

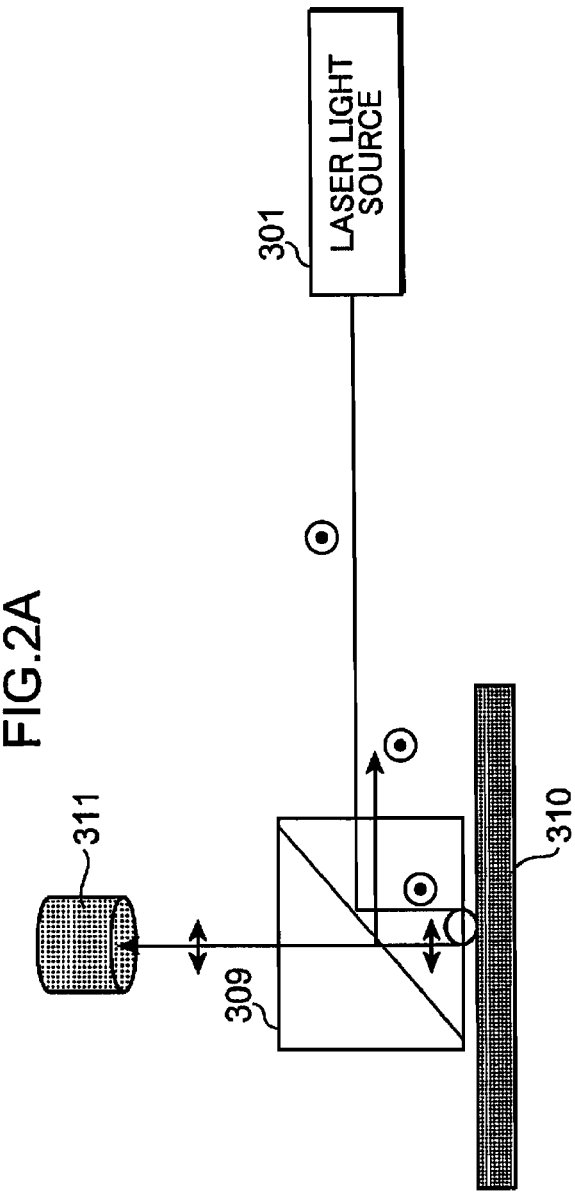
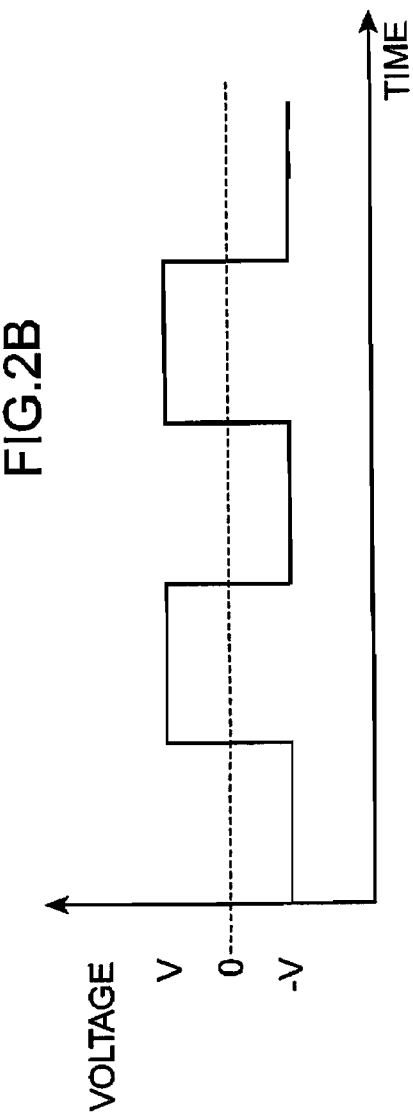
FIG.2A
FIG.2B

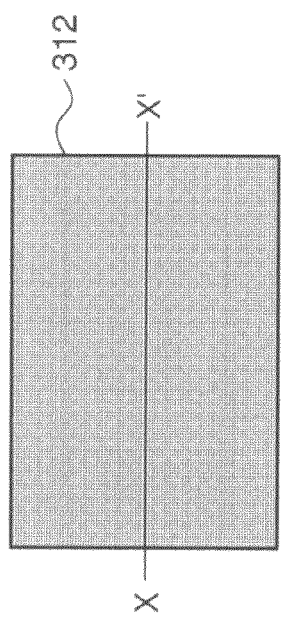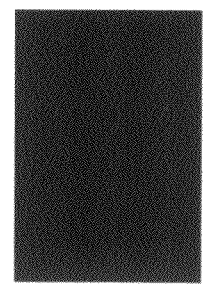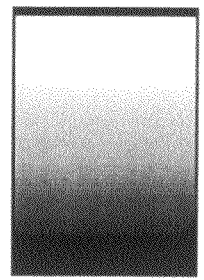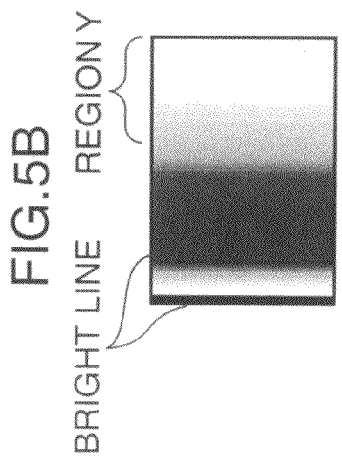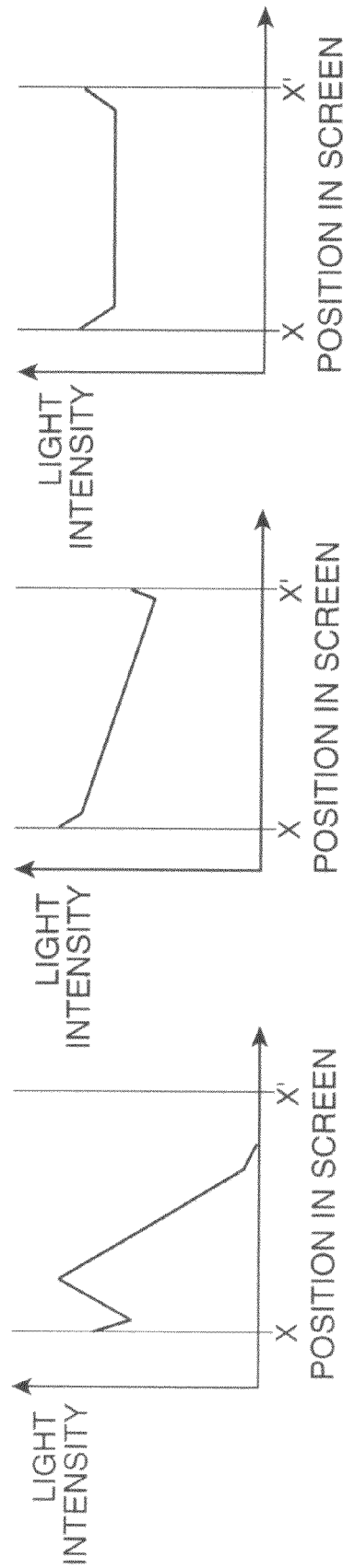

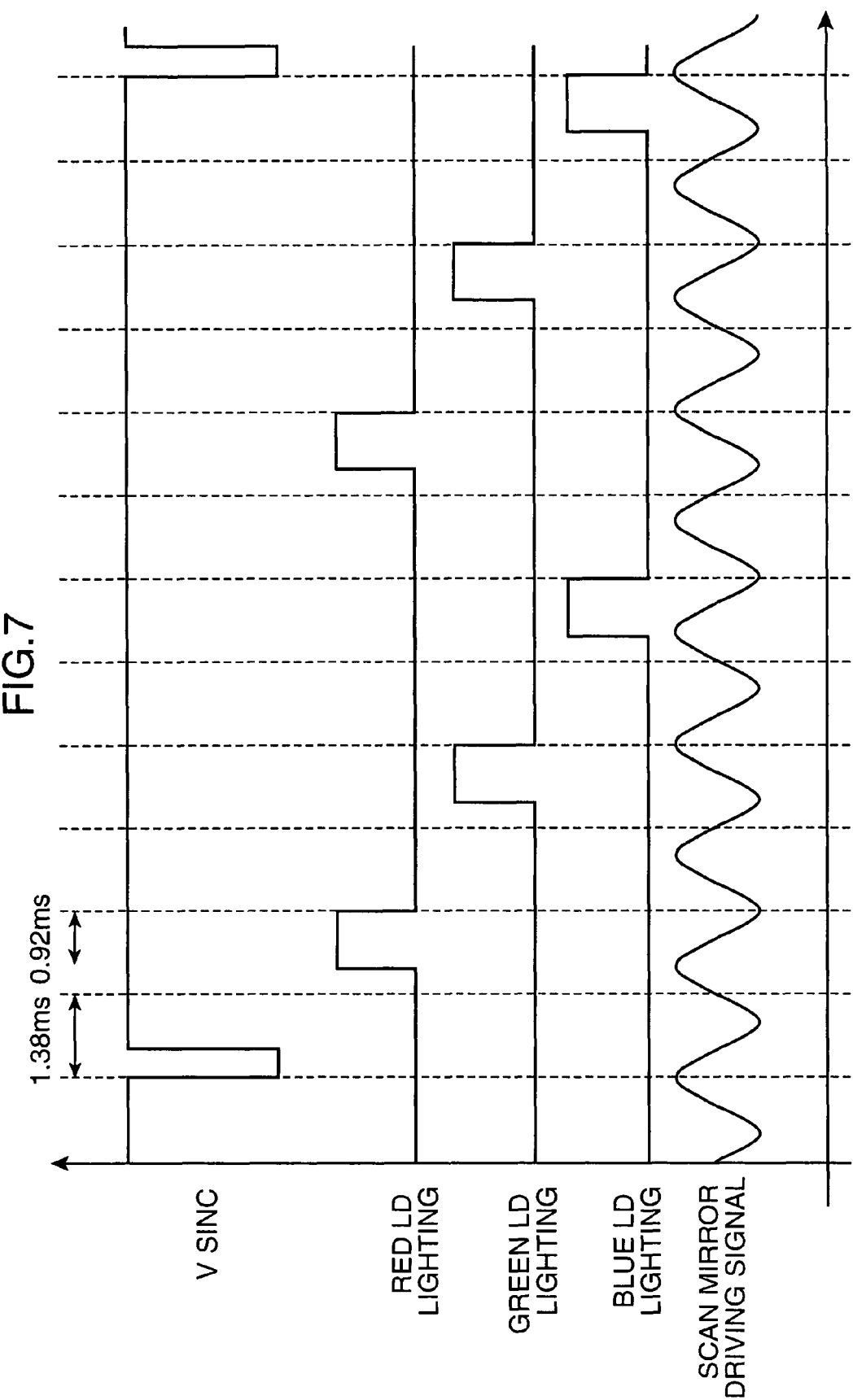

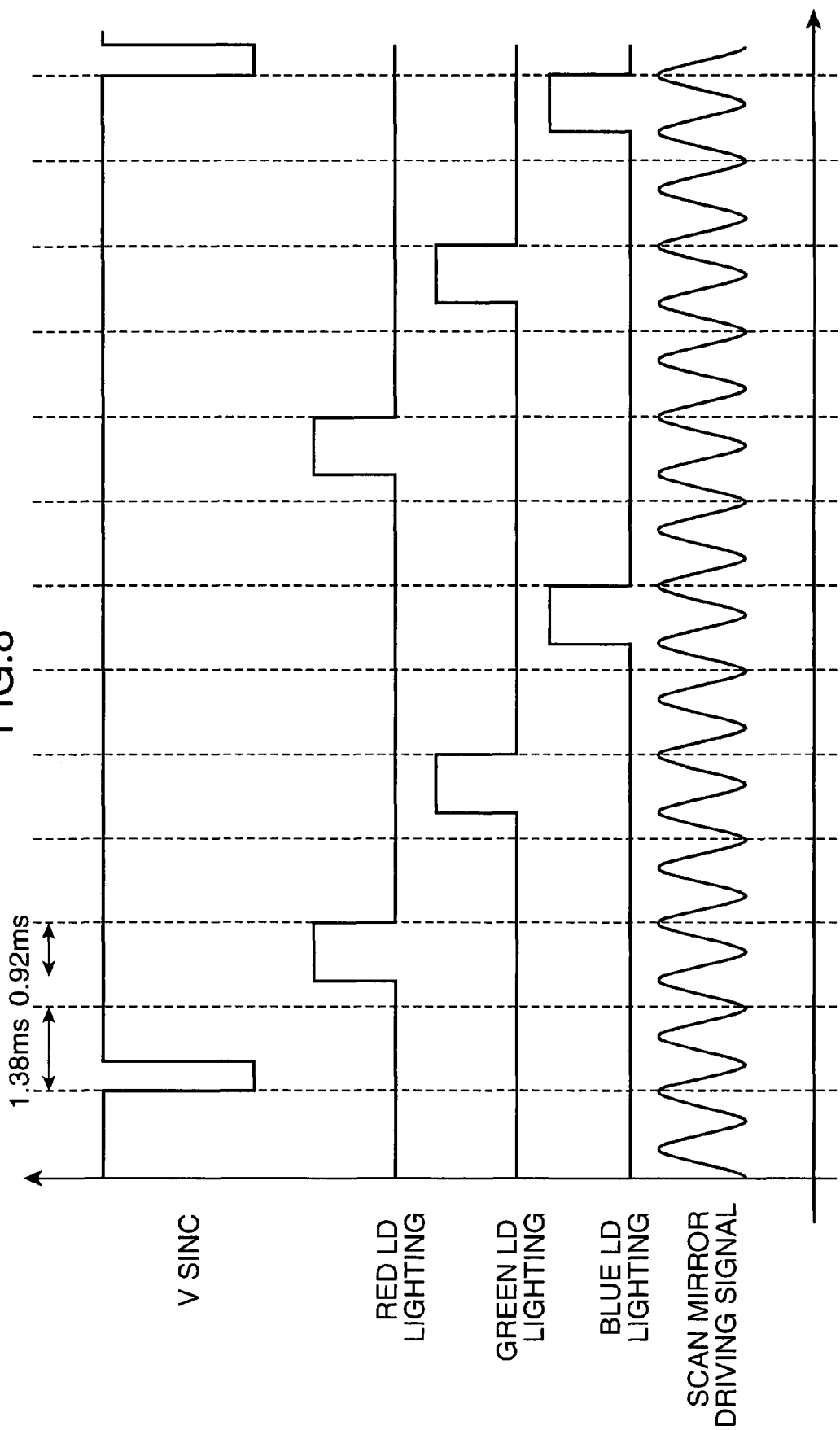

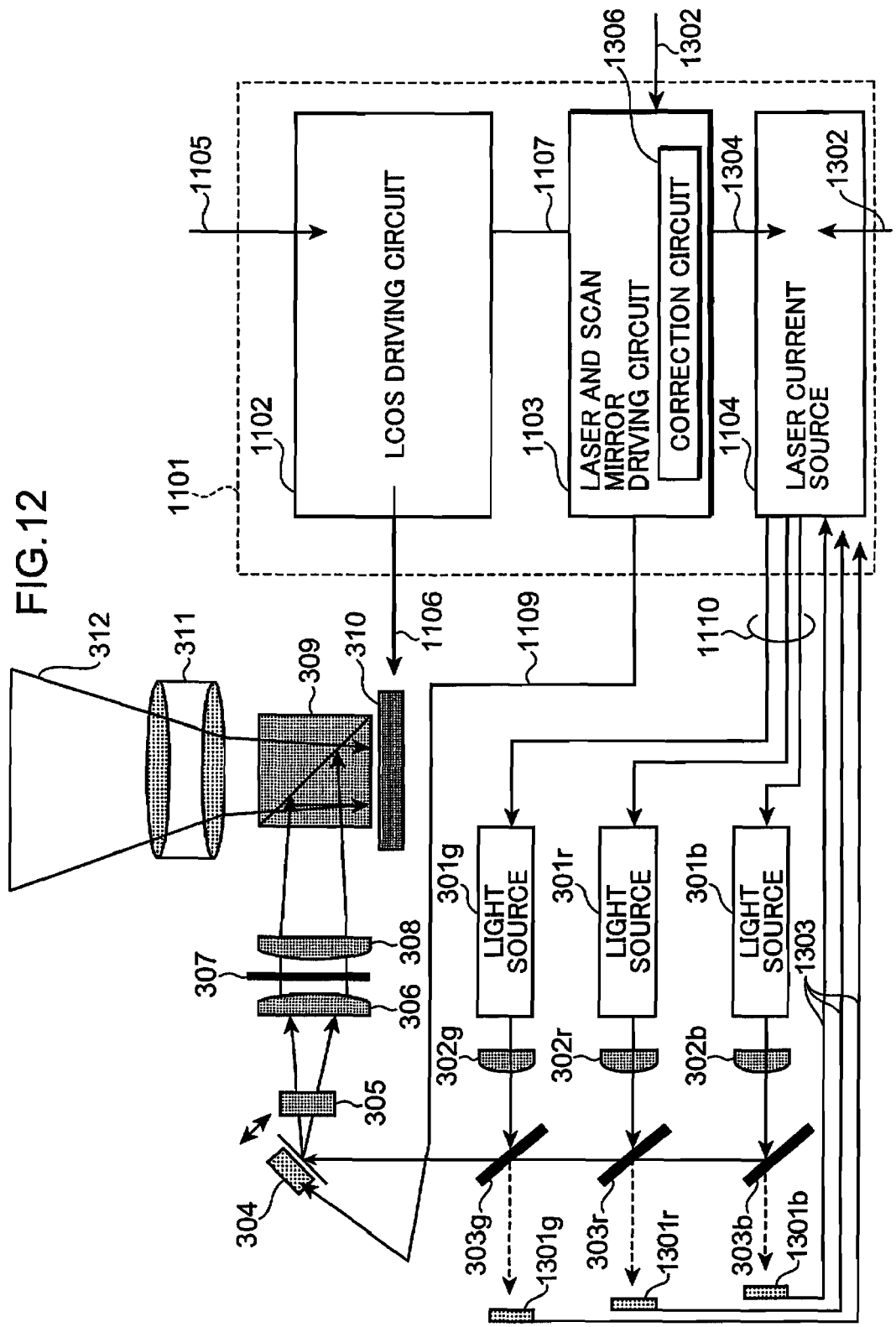

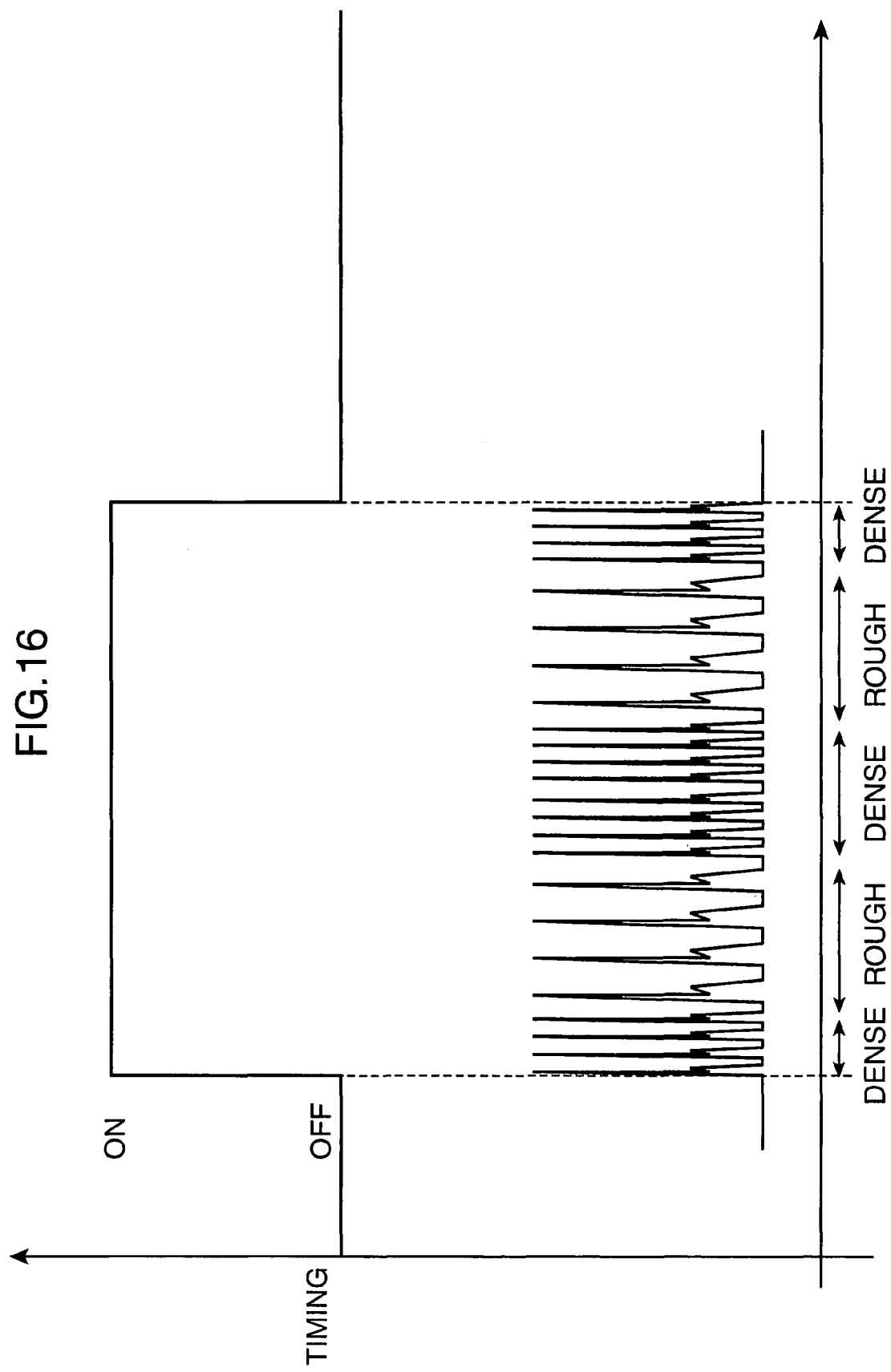

FREQUENCY
MAGNIFICATION = 1.0
AAD=0.108

FREQUENCY
MAGNIFICATION = 0.5
AAD=0.077

IMAGE DISPLAY APPARATUS

BACKGROUND OF THE INVENTION

1. Field of the Invention

The present invention relates to an image display apparatus, such as a video projector, a TV receiver, and a liquid crystal panel, and more particularly, to a compact image display apparatus suitable for portable use.

2. Background Art

There is a laser realized by combining laser light sources for red, green, and blue that are reduced in size and achieve high luminous efficiencies, and a spatial light modulator such as a liquid crystal element, a scan mirror and a micro mirror, and an image display apparatus using this laser as a light source has been actively developed in recent years. Because the laser is monochromatic, the image display apparatus described above is able to have a color reproduction range 1.2 to 1.7 times wider than that of conventional liquid crystal display projector using color filters, CRT using a fluorescent material, and plasma display, etc. Further, because laser light is readily focused and has linearity, it is possible to reduce an optical system in size. It is therefore expected that a high-definition display, a micro-projector, and the like that have been difficult to achieve will be realized.

As is disclosed in U.S. Pat. No. 3,818,129, the study of a laser display has been conducted from long ago. At the early stage of the study, a gas laser was used as the laser light source in most cases and a scan mirror and a galvanometer mirror were used as a spatial light modulator. It is until recent years that semiconductor lasers for red and blue achieve a high output and that a laser for green using a solid-state laser and a wavelength conversion by the non-linear optics effect and various spatial light modulators have been developed. U.S. Pat. No. 5,255,082 discloses such an image display apparatus formed by combining a laser light source, a scan mirror, and a 1D micro mirror. In addition, U.S. Pat. No. 5,506,597 discloses an image display apparatus using a 2D micro mirror. In U.S. Pat. No. 6,183,092 and U.S. Pat. No. 6,910,774, an image display apparatus using a compact liquid crystal panel and an LCOS (Liquid Crystal On Silicon) are developed and reported.

Regarding the apparatus configuration of the image display apparatus described above, U.S. Pat. No. 6,183,092 and U.S. Pat. No. 6,910,774 disclose a method by which 2D modulation is performed color by color and then beams in the respective colors are combined in a prism. FIG. 24 shows the configuration of a 2D image display apparatus described in the two US patents cited above. Laser light 102 emitted from a laser light source 101 is collimated by a lens 103 and a cylindrical lens 104. The collimated light is scanned on a plane mirror 105 provided in a mirror driving device 106. A scanned beam 107 goes incident on an LCOS element 112 via a field lens 108 and a polarizing prism 109. Of an incident beam 110, a beam 111 whose polarization direction has been rotated passes through the prism plane of the polarizing prism 109 and exits as exiting light 118 by passing through a relay lens 113, an optical path conversion mirror 115, and a projection lens 117.

FIG. 25 schematically shows the configuration of a conventional laser display. Rays of light from respective laser light sources 5100a through 5100c for red, green, and blue are expanded in beam diameter by beam expanders 5102 and go incident on optical integrators 5103. The optical integrators 5103 are homogeneous illumination optical systems that illuminate rectangular openings on spatial light modulators 5107 at uniform illumination intensity. The optical integrators 5103 are of a structure in which two flyeye lenses composed of unit lenses of a rectangular shape arrayed in a 2D lattice are disposed in series.

Rays of light having passed through the optical integrators 5103 illuminate the spatial light modulators 5107 via diffusing plates 5106. Rays of light in respective colors modulated by the spatial light modulators 5107 are combined in a dichroic prism 5109 and formed as an image in full color on a screen 5111 by a projection lens 5110.

Herein, the diffusing plates 5106 reduce speckle noises unique to a laser display apparatus. The laser light sources 5100a through 5100c have a narrow spectrum width and are highly coherent. Hence, rays of light projected and scattered on the screen 5111 interfere with one another randomly, which gives rises to speckle noises like fine particles. The diffusing plates 5106 are formed of a transparent substrate made of polished glass that provides a random phase distribution to the wave front of incident light. By oscillating the diffusing plates 5106 using diffusing plate oscillation means 5113, the phase distribution of light projected onto the screen 5111 varies with the movement of the diffusing plates 5106. As a result, the microscopic pattern of the speckle noises varies as well with time. By oscillating the diffusing plates 5106 so that the pattern of the speckle noises changes faster than an after image time of the viewer, the speckle noises are time-averaged in the eyes of the viewer, which enables a noiseless high-quality image to be perceived.

In the image display apparatus described above, the spatial light modulators 5107 are provided in a one-to-one correspondence with the respective laser light sources 5100a, 5100b, and 5100c for red, green, and blue. Hence, because the homogeneous illumination optical system is necessary for each of the laser light sources 5100a, 5100b, and 5100c, the number of components is large and a component at a high cost, like the dichroic prism, is used. In addition, because the homogeneous illumination optical system occupies a large volume and the diffusing plate oscillation means 5113 is separately necessary for reducing the speckle noises, there arises a problem that the overall apparatus becomes larger.

Meanwhile, different from the method for combining beams in the prism as described above, the field sequential method by which respective light sources are lit ON sequentially to display a color image using an after image in human eyes is now being discussed for the 2D image display apparatus using a light emitting diode as a light source. The former method by which beams are combined in the prism excels in terms of the beauty and brightness of an image. However, the latter field sequential method excels in terms of space saving and the number of components (cost). A pocket projector of a cigarette case size using the field sequential method and formed by combining two scan mirrors and laser light sources for red, green, and blue has been actively developed.

In the field sequential method described above, it is possible to use a micro mirror array represented by a DMD (Digital Micromirror Device) and a liquid crystal on silicon (LCOS) using ferroelectric liquid crystals as the spatial light modulator. These spatial light modulators modulate light by digitally switching ON and OFF light. In a case where the halftone is expressed, the halftone is expressed by changing an ON time of the spatial light modulator with respect to a lighting time of the light source pixel by pixel.

A method for expressing grayscale in a case where the LCOS is used as the spatial light modulator will be described using FIG. 26. The ON/OFF switching of LCOS driving signals a through f is controlled with respect to a lighting time $t_{LD}$ of the light source. In other words, by keeping the driving signal switched ON for 100% of the period of $t_{LD}$ (in the case of the driving signal a), a bright state is achieved. Also, in a case where the ON time is reduced to 0 with respect to $t_{LD}$ by changing the phase of the driving signal (in the case of the driving signal f), a dark state is achieved. The halftone grayscale is achieved by gradually shifting the phase of the ON timing of the driving signal of the LCOS (in the case of the driving signals b through e). A video is formed by performing the operations as above pixel by pixel. These operations are performed not only with the LCOS, but also with the DMD (Digital Micromirror Device) that performs digital modulation.

However, in the 2D image display apparatus using the laser as described above, in a case where the laser light source is lit ON by the field sequential method using the spatial light modulator described above and the scan mirror, problems, such as an increase of a display error in a pixel, contrast deterioration, and noises like a sandstorm, are known to occur in pixels expressing the halftone. These problems possibly become factors that interfere with the realization of the field sequential method that is essential in realizing a compact image display apparatus with excellent portability.

As has been described, attention has been focused on a display apparatus using a laser light source in recent years. In a display using the laser light source, because each ray of light from the laser light source is monochromatic light, it is possible to display an extremely clear image at a high color purity by using a laser light source of an appropriate wavelength. In addition, because the laser light source has high directivity and a focus is achieved efficiently, it is easy to reduce the optical system in size. Further, because it has high photoelectric conversion efficiency, power can be saved in comparison with a conventional lamp light source. From these characteristics, it is possible to realize a more compact display apparatus by using the laser light source, and a portable projector apparatus, such as a pocket projector, is now receiving attention.

However, the field sequential method requires a spatial light modulator with a high display rate. JP-A-5-150209 discloses the configuration of a laser projector by the field sequential method using a single spatial light modulator. According to this configuration, a fixed laser beam is expanded and irradiated to the spatial light modulator. Hence, no consideration is given to a reduction of speckle noises, which makes it impossible to achieve a high-quality image.

There is a ferroelectric liquid crystal element as a spatial light modulator with a high display rate. Different from the conventional element using the nematic liquid crystal phase, the ferroelectric liquid crystal element uses the chiral smectic liquid crystal C phase having spontaneous polarization. In the chiral smectic liquid crystal C phase, the liquid crystal molecules form a layer structure and have spontaneous polarization (PS) in a direction perpendicular to the layer. When an electric field is applied in this direction, the molecules are re-oriented with their spontaneous polarizations being aligned in the direction of the electric field and stay in a bistable state. When combined with a pair of polarization plates (a polarizer and an analyzer), a monochromatic display is achieved. Because the conventional nematic liquid crystal is paraelectric, a response rate induced by application of an electric field is of the order of msec. On the other hand, because the ferroelectric liquid crystal switches by a direct interplay of the spontaneous polarization and the electric field, it is possible to achieve a response rate of the order of μsec, which is an increase of three orders of magnitude. Hence, the ferroelectric liquid crystal element described above is suitable for the field sequential method and performs a grayscale display digitally by the modulation of a time width of a monochrome display. As a product using such a ferroelectric liquid crystal element, there is an LCOS micro display (for example, LV311 available from Displaytech Ltd.) using a semiconductor silicon wafer as a back plane.

Herein, in order to reduce the display apparatus further in size, the homogeneous illumination optical system may be reduced in size. When a laser is used as the light source, because a beam can be made homogenous efficiently by scanning a focused laser beam, it is possible to reduce the homogenous illumination optical system in size. Further, by allowing the beam to pass through the diffusing plate, it is possible to reduce speckle noises at the same time. However, because the ferroelectric liquid crystal element described above displays the grayscale by the time width modulation, there may be a case where it fails to display the grayscale appropriately depending on the timing of a beam scan and a pixel display. It is therefore necessary to use a spatial light modulator for an analog grayscale display. However, a spatial light modulator capable of performing the analog grayscale display has so slow a display rate that it is not suitable for the field sequential method. In short, it is difficult to realize the field sequential method. Hence, there remains a need for the conventional configuration shown in FIG. 25 in which a spatial light modulator is necessary for each laser light source, which makes a reduction of an apparatus in size infeasible.

SUMMARY OF THE INVENTION

An advantage of the invention is to realize a compact image display apparatus with excellent portability and capable of displaying an image at high accuracy.

An image display apparatus according to an aspect of the invention includes: a laser light source; a beam scan portion that scans a laser beam emitted from the laser light source; a spatial light modulator that spatially digital-modulates the laser beam scanned by the beam scan portion; and a diffusing member that is disposed between the beam scan portion and the spatial light modulator and diffuses the laser beam scanned by the beam scan portion in a scan direction of the beam scan portion, wherein the beam scan portion scans the laser beam so that an image of one frame is formed by a continuous display of plural fields; and a scan timing of the beam scan portion is synchronized with the light emitting timing of the laser light source.

According to the image display of the invention, it possible to realize a compact and simple illumination optical system achieving both homogenization and the effect of reducing the speckle noises.

BRIEF DESCRIPTION OF THE DRAWINGS

FIG. 2A is a schematic view showing a manner in which laser light from a laser light source 301 goes incident on an LCOS 310 via a prism 309 and comes out from the LCOS 310 after the polarization direction is changed;

FIG. 2B is view showing a change over time of a driving voltage applied to the LCOS 310;

FIG. 5A is a schematic view of a screen 312;

FIG. 5B is a view showing the relation of the in-plane position on a straight line x-x' of FIG. 5A and light intensity in the case of FIG. 4B;

FIG. 5C is a view showing the relation of the in-plane position on the straight line x-x' of FIG. 5A and light intensity in the case of FIG. 4C;

FIG. 5D is a view showing the relation of the in-plane position on the straight line x-x' of FIG. 5A and light intensity in the case of FIG. 4D;

FIG. 7 is a timing chart showing the relation among a vertical synchronization signal that drives an LCOS signal of the LCOS 310, light emitting timing of the red, green, and blue laser light sources 301r, 301g, and 301b, and a driving signal of the scan mirror 304, all of which are shown in FIG. 1;

FIG. 8 is a timing chart showing the relation among a vertical synchronization signal that drives an LCOS signal of the LCOS 310, light emitting timing of the red, green, and blue laser light sources 301r, 301g, and 301b, and a driving signal of the scan mirror 304, all of which are shown in FIG. 1;

FIG. 12 is a schematic view used to describe an example of the configuration of a laser and scan mirror driving circuit 1103 provided with a light intensity correction circuit 1306 that replaces a light intensity correction table 1305 of FIG. 11;

FIG. 16 is a view showing the light emitting timing and an output waveform of a higher harmonic of the fiber laser of FIG. 14;

DETAILED DESCRIPTION OF THE PREFERRED EMBODIMENTS OF THE INVENTION

Figure 1:
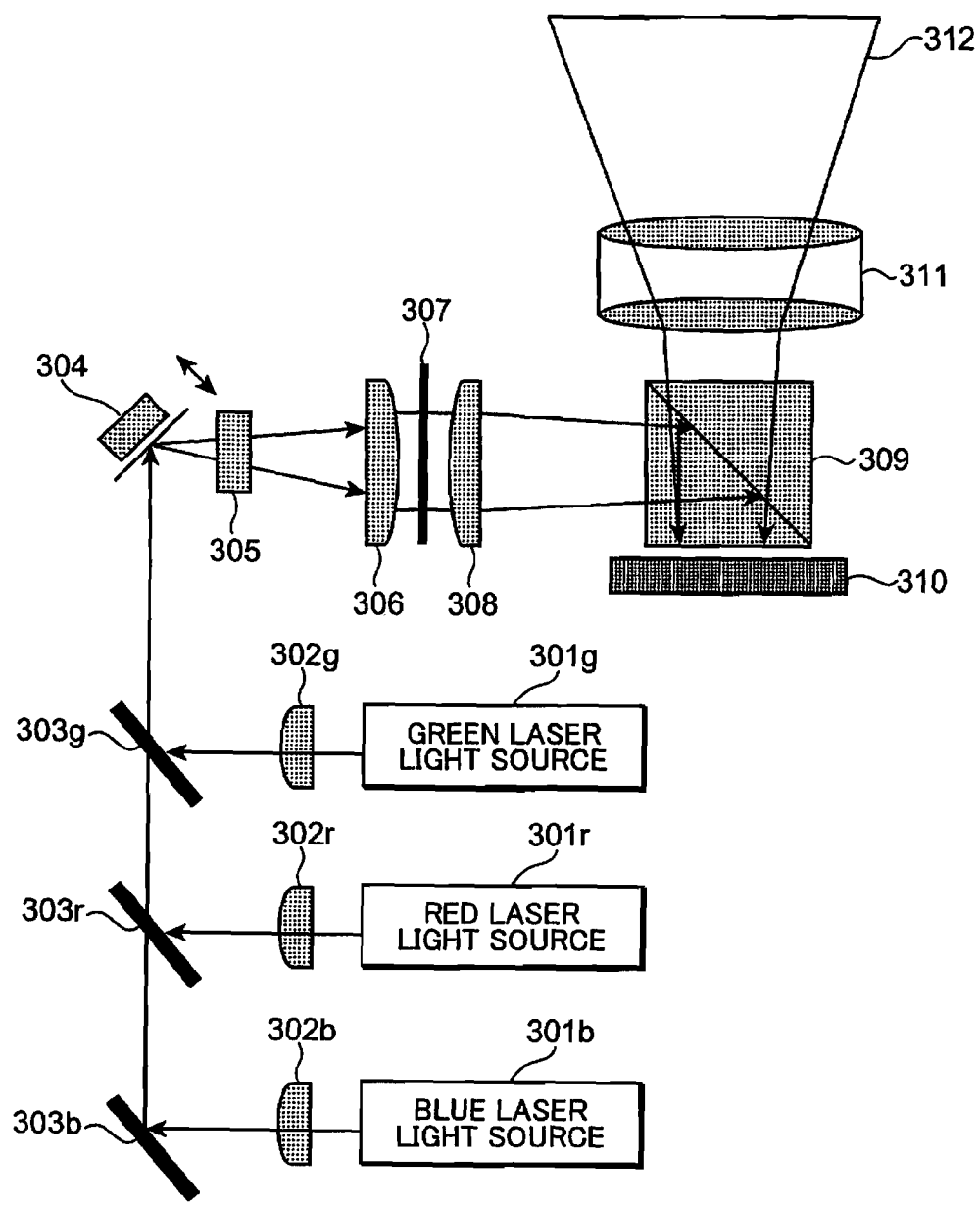
FIG. 1 is view schematically showing the configuration of a 2D image display apparatus according to a first embodiment of the invention.

Hereinafter, embodiments of the invention will be described with reference to the drawings. Same or similar components are labeled with same or similar reference numerals, and descriptions of such components may be omitted in the description of the drawings where appropriate.

First Embodiment

The configuration of a 2D image display apparatus according to a first embodiment of the invention is shown in FIG. 1. The 2D image display apparatus of this embodiment includes a blue laser light source 301b, a red laser light source 301r, a green laser light source 301g, collimate lenses 302b, 302r, and 302g, mirrors 303b, 303r, and 303g, a scan mirror 304, a cylindrical lens 305, a relay lens 306, a diffusing plate 307, a field lens 308, a prism 309, a 2D spatial light modulator 310, a projection lens 311, and a screen 312. This embodiment will describe a case where a liquid crystal on silicon (LCOS) is used as the 2D spatial light modulator 310. It goes without saying, however, that the 2D spatial light modulator 310 of this embodiment is not limited to the LCOS.

Rays of laser light emitted from the blue laser light source 301b, the red laser light source 301r, and the green laser light source 301g are collimated to rays of parallel light by the collimate lenses 302r, 302g, and 303b, respectively. The mirrors 303r, 303b, and 303g are dielectric multi-layer mirrors having reflection characteristics in the regions of red (wavelength of 600 nm or greater), blue (wavelength of 400 to 460 nm), and green (wavelength of 520 to 560 nm), respectively. The locations of the lenses 302r, 302g, and 302b and the mirrors 303r, 303g and 303b are adjusted in such a manner that the beam paths of the blue laser light source 301b, the red laser light source 301r, and the green laser light source 301g become coaxial immediately after the beams go out from the mirror 303g. The scan mirror 304 scans a beam coming out from the mirror 303g in directions within the sheet surface of FIG. 1. The cylindrical lens 305 shapes a beam scanned by the scan mirror 304 into a linear bright line. The diffusing plate 307 is disposed between the relay lens 306 and the field lens 308, and further makes the beam that has been shaped to a bright line by the cylindrical lens 305 into a strip shape. The prism 309 is a polarized beam splitter. The ON/OFF switching of the LCOS 310 is performed by rotating the polarization direction of light. Hence, the prism 309 has to be a polarized beam splitter. A beam directed to a light path by the scan mirror 304 goes incident on the prism 309 in the form of S-polarized light. Because a reflection film inside the prism 309 is designed so as to reflect S-polarized light, the light of S-polarized light illuminates the LCOS 310.

Operations of the LCOS 310 of FIG. 1 will now be described using FIGS. 2A and 2B. FIG. 2A is a schematic view showing a manner in which laser light from the laser light source 301 goes incident on the LCOS 310 via the prism 309 and goes out from the LCOS 310 after the polarization direction is changed. FIG. 2B shows a view showing a change over time of a driving voltage applied to the LCOS 310. In a state where no driving voltage is applied, the LCOS 310 polarizes light randomly. For example, it rotates the polarization direction by 90 degrees when a positive voltage is applied and it maintains the polarization direction when a negative voltage is applied. The polarization direction is rotated/maintained by the element configuration of the LCOS 310. Because polarization takes place randomly while no voltage is applied, it is necessary to apply a voltage even when black is displayed.

Of the pixels of the LCOS 310, for those switched ON by application of a positive voltage, the polarization direction is rotated by 90 degrees. Laser light of S-polarized light from the laser light source 301 is thus changed to P-polarized light, and goes incident again on the prism 309. It is configured in such a manner that light of P-polarized light passes through the prism 309 intact, and is expanded by the projection lens 311 for a video to be projected onto the screen 312. Light is scanned by the scan mirror 304 for the purpose of illuminating the entire display region of the LCOS 310. It is designed in such a manner that a bight line reciprocates the display region of the LCOS 310 once as the scan mirror scans in one cycle.

In the 2D image display apparatus using such a laser light source, in a case where the laser light sources are lit ON by the field sequential method using the spatial light modulator, such as the LCOS, and the scan mirror, problems, such as an increase of a display error in a pixel, contrast deterioration, and noises like a sandstorm, are known to occur in pixels expressing the halftone.

Figure 3A:
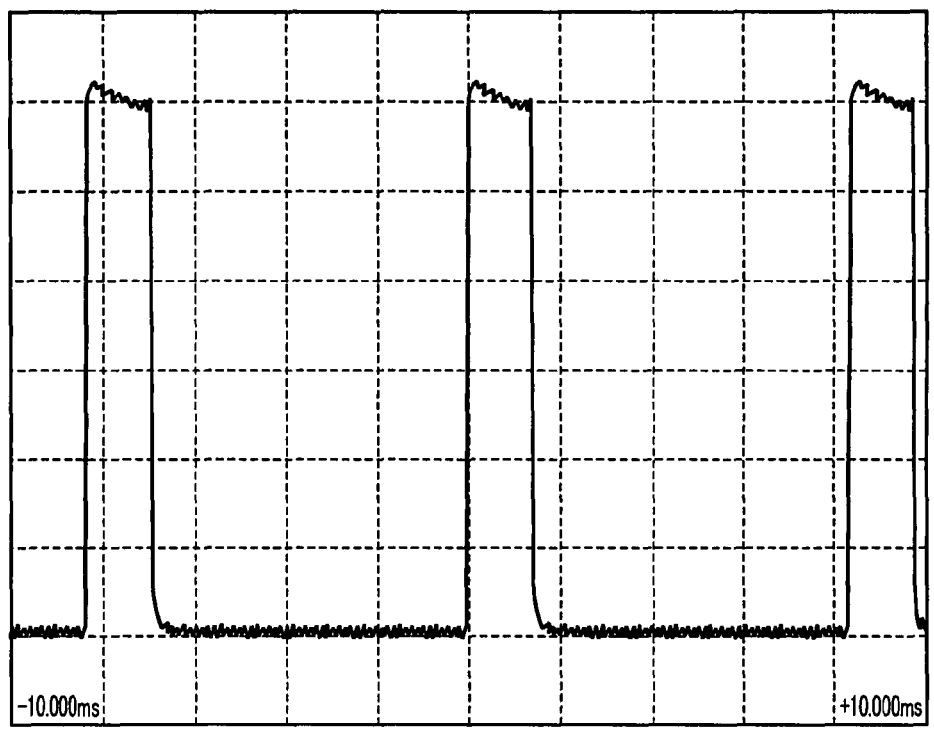
FIG. 3A is a plot diagram showing the relation of a light emitting time and light intensity in a case where a blue (wavelength of 450 nm) semiconductor laser is operated in modulation.
Figure 3B:
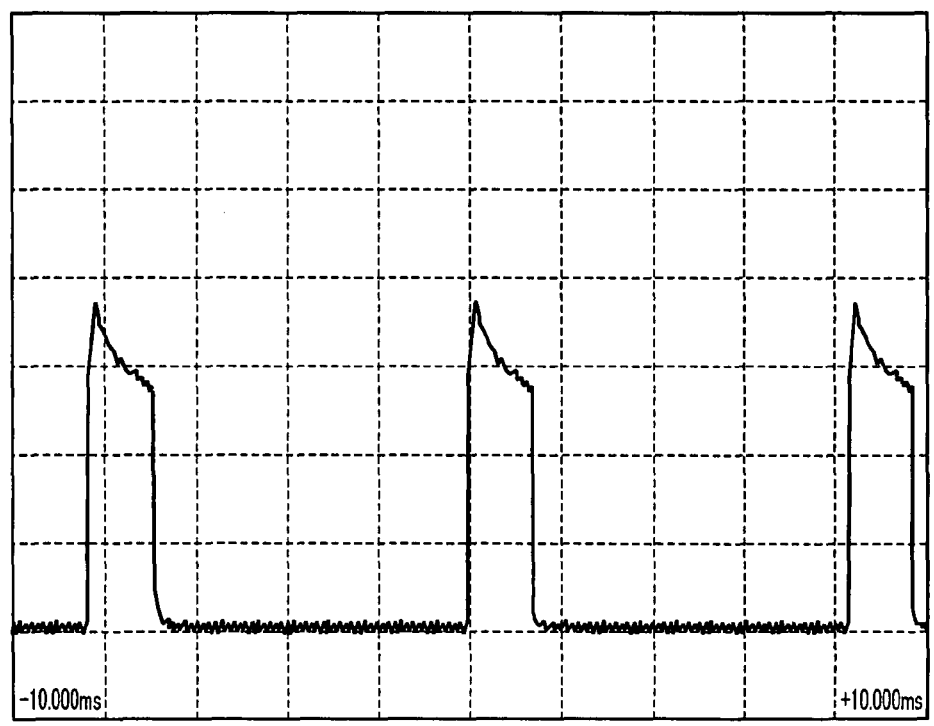
FIG. 3B is a plot diagram showing the relation of a light emitting time and light intensity in a case where a red (wavelength of 640 nm) semiconductor laser is operated in modulation.

Meanwhile, when the laser light sources are light ON sequentially by the field sequential method, the light intensity will not remain at a constant level because of the temperature characteristics of the laser light sources or the like. FIG. 3A is a plot diagram showing the relation of a light emitting time and light intensity when the blue (wavelength of 450 nm) semiconductor laser is operated in modulation. FIG. 3B is a plot diagram showing the relation of a light emitting time and light intensity when the red (wavelength of 640 nm) semiconductor laser is operated in modulation. For example, in a case where the red semiconductor laser having the wavelength of 635 to 640 nm susceptible to heat is modulated, as is shown in FIG. 3B, distortion called a "droop" occurs in the waveform of light intensity, and there is a problem that although light intensity is high immediately after the lighting, the light intensity keeps dropping little by little. It is understood from the plot diagram of FIG. 3A that there is such a tendency not only in the red semiconductor laser but also in the blue semiconductor laser. The use of such a light source possibly causes a bright line to appear on the display screen and/or gives rise to irregularities in brightness and contrast deterioration.

Figure 4A:
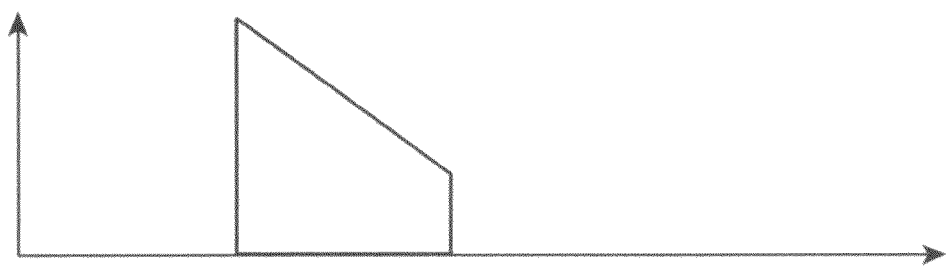
FIG. 4A is view showing a change over time of light intensity of laser light sources 301b, 301r, and 301g.
Figure 4B:
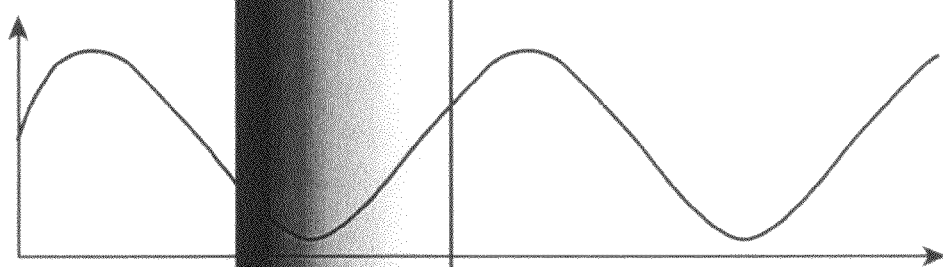
FIG. 4B is a view showing a case where the lighting start timing of the laser light sources 301b, 301r, and 301g does not coincide with the phase of a driving signal of a scan mirror 304.
Figure 4C:
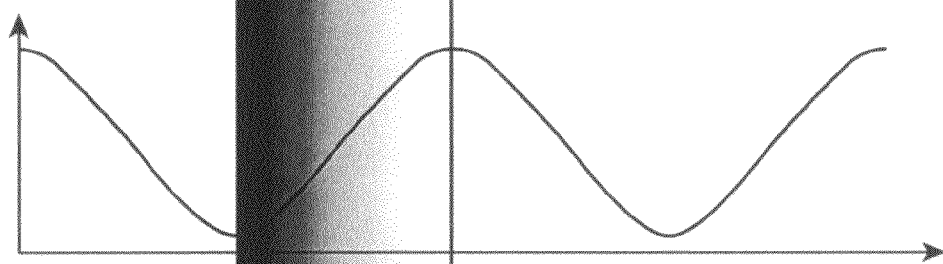
FIG. 4C is a view showing a case where the lighting start timing of the laser light sources 301b, 301r, and 301g coincides with the phase of a driving signal of the scan mirror 304 and illumination light scans on the LCOS 310 only once.
Figure 4D:
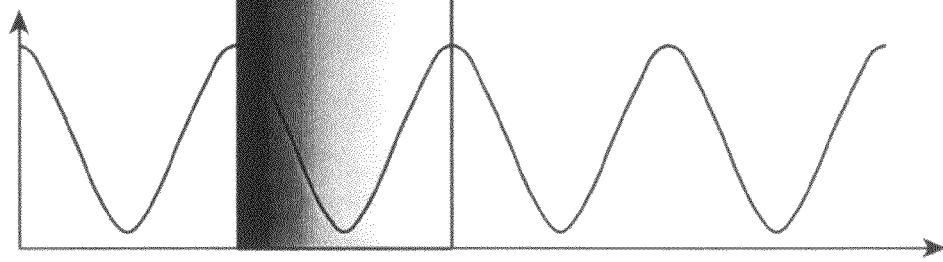
FIG. 4D is a view showing a case where the lighting start timing of the laser light sources 301b, 301r, and 301g coincides with the phase of a driving signal of the scan mirror 304 and illumination light scans on the LCOS 310, twice.

The relation of the light intensity of the laser light sources 301b, 301r, and 301g and a driving signal of the scan mirror 304 is shown in FIGS. 4A through 4D. FIG. 4A is a view showing a change over time of the light intensity of the laser light sources 301b, 301r and 301g. FIG. 4B is a view showing a case where the lighting start timing of the laser light sources 301b, 301r, and 301g does not coincide with the phase of the driving signal of the scan mirror 304. FIG. 4C is a view showing a case where the lighting start timing of the laser light sources 301b, 301r, and 301g coincides with the phase of the driving signal of the scan mirror 304 and illumination light scans on the LCOS 310 only once (illumination light scans the mirror only one way). FIG. 4D is a view showing a case where the lighting start timing of the laser light sources 301b, 301r, and 301g coincides with the phase of the driving signal of the scan mirror 304 and illumination light scans on the LCOS 310 twice (illumination light scans the mirror in a reciporcatory manner).

FIG. 5A is a schematic view of the screen 312. FIG. 5B is a view showing the relation of the in-plane position on a straight line x-x' of FIG. 5A and the light intensity in the case of FIG. 4B. FIG. 5C is a view showing the relation of the in-plane position on the straight line x-x' of FIG. 5A and the light intensity in the case of FIG. 4C. FIG. 5D is a view showing the relation of the in-plane position on the straight line x-x' of FIG. 5A and the light intensity in the case of FIG. 4D. Further, the brightness and how the colors are viewed by the viewer on the screen 312 are schematically shown in FIGS. 5B through 5D.

FIG. 5B shows a case where the scan mirror 304 is scanned by the driving signal of FIG. 4B. A portion where light intensity reaches the maximum as the laser light source is lit ON is generated somewhere in the middle of the straight line x-x' on the screen 312. Bright lines therefore appear within the screen 312. Also, because the laser light source is lit OFF before the screen 312 is illuminated entirely, there is left a region Y on which no illumination light is irradiated.

FIG. 5C shows a case where the scan mirror 304 is scanned by the driving signal of FIG. 4C. In this case, the lighting time of the laser light source is brought into coincidence with the phase of the driving signal. Although the screen 312 is illuminated entirely, a difference in brightness is generated in the right and left of the screen 312 due to the droop unique to the laser light source. This is because the illumination light scans on the LCOS 310 only once.

As has been described, when the pulse-driven laser light sources and the scan optical system are used, as are shown in FIGS. 5B and 5C by way of example, there are a synchronizing method and the number of scans by and with which the LCOS 310 is not illuminated uniformly.

Such being the case, the scan mirror 304 is scanned by the driving signal of FIG. 4D to bring the lighting time of the laser light source into coincidence with the phase of the driving signal while illumination light is reciprocated on the LCOS 310. The result of this case is set forth in FIG. 5D. In comparison with the cases of FIGS. 5B and 5C, the light intensity on the screen is made more homogenous.

As has been described, by establishing $T_{Laser\_ON} = n \cdot T_{scan}$ (n is an integer) in the relation of a cycle of a driving signal of the scan mirror, $T_{scan}$, and a lighting time of the laser light source, $T_{Laser\_ON}$, it is possible to illuminate the screen 312 more homogeneously. In the case of 4D, n=1.

In the case of this embodiment, the scan mirror 304 uses an electromagnetic actuator of a moving magnet method, which is used at a frequency in the vicinity of the resonance frequency. The electromagnetic actuator is advantageous in that the configuration is simple and it can be manufactured at a low cost. The effect of making illumination more homogeneous becomes larger as the driving frequency of the scan mirror 304 is increased. However, when the resonance frequency of the electromagnetic actuator that drives the scan mirror 304 is increased, it becomes difficult to achieve a scan angle sufficient for illumination on the LCOS 310. Given these circumstances, the diffusing plate 307 is used, so that an area that can be illuminated within a unit time is increased even at the same scan speed and scan angle. This makes it possible to make the scan angle of the scan mirror 304 smaller, which can in turn accelerate the scan mirror 304. Hereinafter, the effect of the diffusing plate 307 will be described using FIGS. 6A and 6B.

Figure 6B:
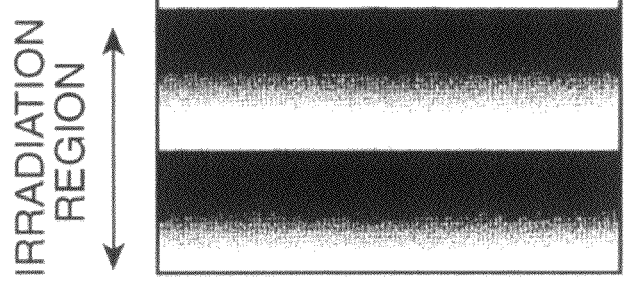
FIG. 6B is a view showing an illumination region on the screen 312 of the 2D image display apparatus of FIG. 1.
Figure 6A:
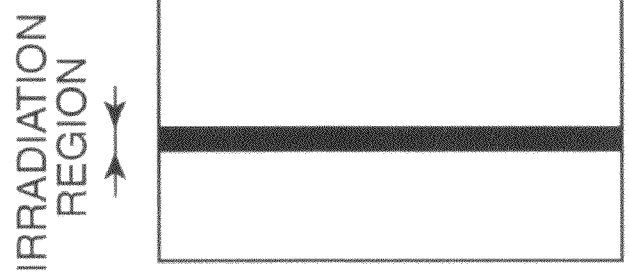
FIG. 6A is a view showing an illumination region on the screen 312 in a case where a diffusing plate 307 is removed from the 2D image display apparatus of FIG. 1.

FIG. 6A is a view showing an illumination region on the screen 312 in a case where the diffusing plate 307 is removed from the 2D image display apparatus of FIG. 1. FIG. 6B is a view showing an illumination region on the screen 312 of the 2D image display apparatus of FIG. 1. Both FIGS. 6A and 6B show the illumination regions on the screen 312 when a scan by the scan mirror 304 is suspended. As is obvious from FIGS. 6A and 6B, it is understood that the illumination region is enlarged by disposing the diffusing plate 307. The illumination region when a scan is suspended preferably accounts for 20 to 50% of the image display region. Meanwhile, when the angle of diffusion of the diffusing plate 307 is taken into account, there may be a loss in a quantity of light when the angle of diffusion is too large. Hence, it is preferable that the angle of diffusion falls within a range of 3 to 10°, and more preferably a range of 3 to 5°.

FIGS. 7 and 8 show timing charts of a vertical synchronization signal (V-SYNC) driving an LCOS signal of the LCOS 310, light emitting timing of the red, green, and the blue laser light sources 301r, 301g, and 301b, and a driving signal of the scan mirror 304, all of which are shown in FIG. 1. FIG. 7 shows a case where the LCOS 310 is illuminated one way, and the frequency of the driving signal of the scan mirror 304 in this instance is 543 Hz. FIG. 8 shows a case where light reciprocates on the LCOS 310 once, and the frequency of the driving signal of the scan mirror 304 in this instance is 1086 Hz.

Those shown in FIGS. 7 and 8 describe a case where each laser light source is driven at a double-speed mode in which the light source lights ON twice as fast as the cycle of V-SYNC. However, in order to avoid a problem, such as color breaking, at least a quadruple-speed mode is preferable. Meanwhile, the scan angle tends to become smaller as the driving frequency of the electromagnetic scanner is increased, and in a case where the angle of contact is ±5 degrees, the limit is about 2 kHz. Under these circumstances, driving at a quadruple-speed mode is enabled by making the scan angle as small as ±3° by inserting the diffusing plate 307.

Figure 9:
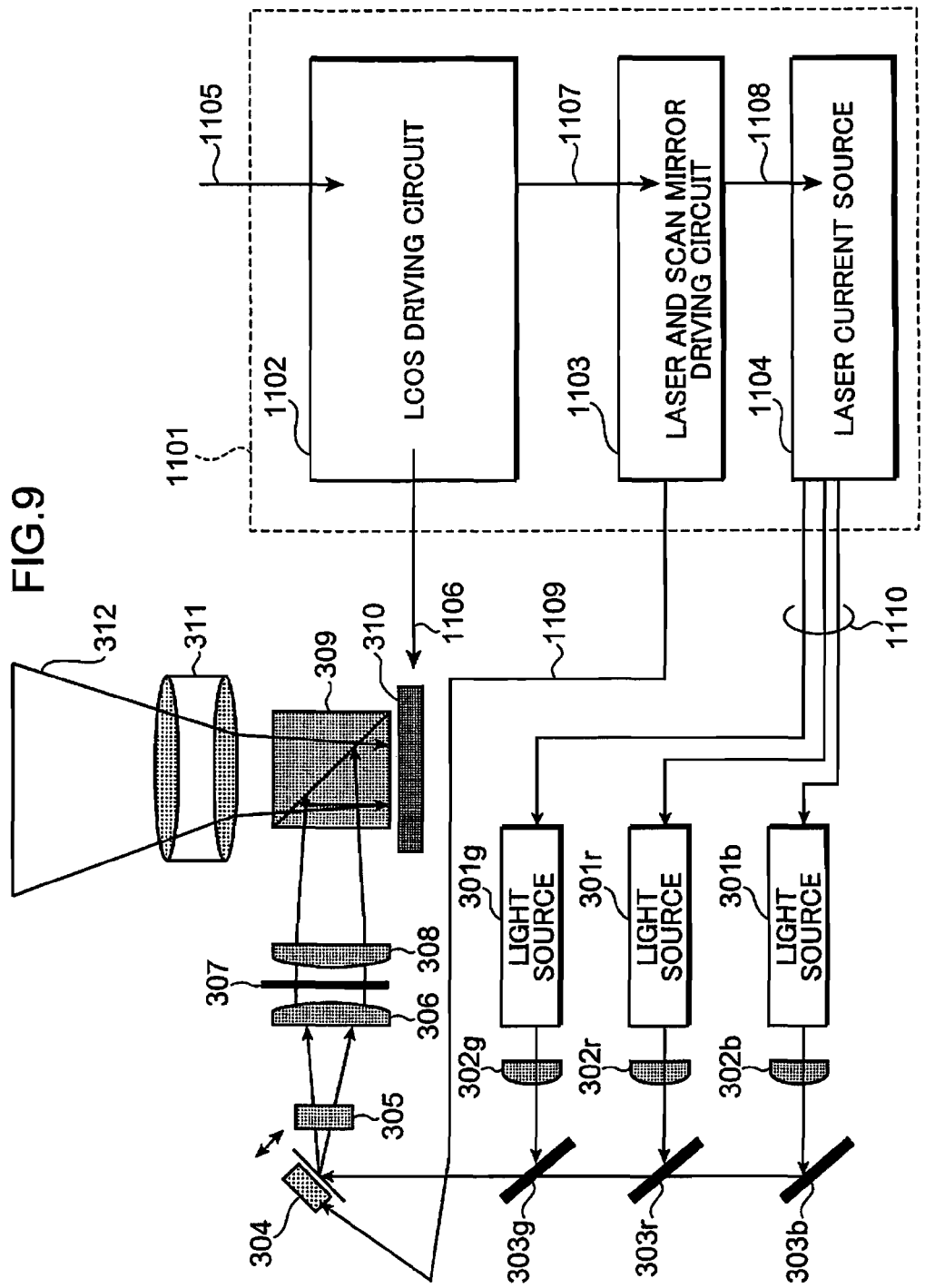
FIG. 9 is a schematic view used to describe an example of the configuration to control the laser light sources 301r, 301g, and 301b, the scan mirror 304, and the LCOS 310 of FIG. 1.

The configuration to control the laser light sources 301r, 301g, and 301b, the scan mirror 304, and the LCOS 310 of FIG. 1 will now be described. FIG. 9 is a view used to describe an example of the configuration to control the laser light sources 301r, 301g, and 301b, the scan mirror 304, and the LCOS 310 of FIG. 1. Portions same as the counterparts in FIG. 1 are labeled with the same reference numerals.

Figure 10:
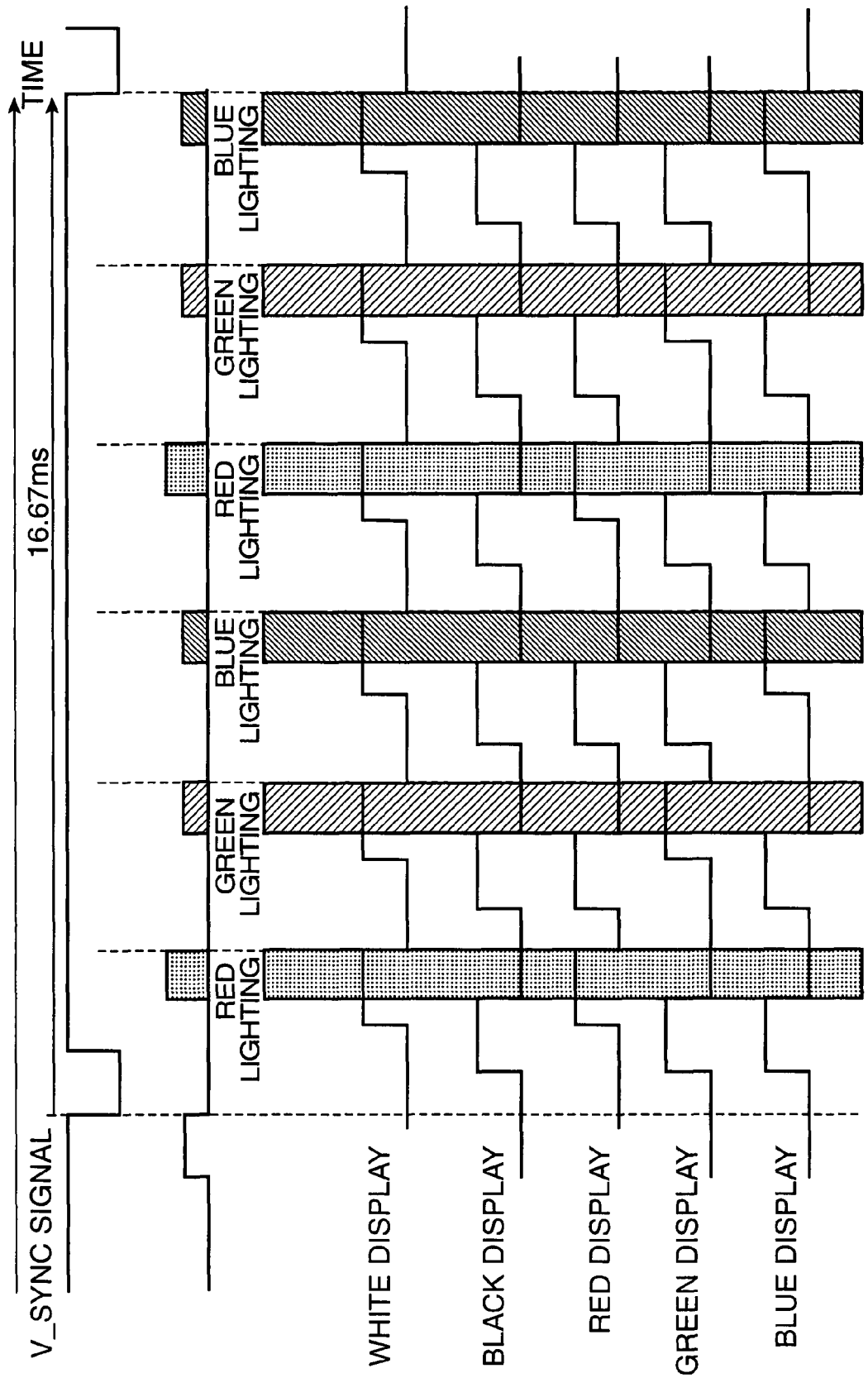
FIG. 10 is a view showing the relation of a V-SYNC signal 1107 and a light emitting trigger 1108 of FIG. 9.

A controller 1101 includes an LCOS driving circuit 1102, a laser and scan mirror driving circuit 1103, and a laser current source 1104. When a video signal 1105 from the outside of the controller 1101 is inputted into the LCOS driving circuit 1102, the LCOS driving circuit 1102 generates an LCOS driving signal 1106. The LCOS driving circuit 1102 outputs the LCOS signal 1106 to the LCOS 310 while it outputs the V-SYNC signal 1107, which is a part of the LCOS driving signal 1106, to the laser and scan mirror driving circuit 1103. The laser and scan mirror driving circuit 1103 is triggered by the V-SYNC signal 1107 to generate a driving signal 1109 of the scan mirror 304 and a light emitting trigger 1108 that determines the light emitting timing of the laser light sources 301r, 301g and 301b. The laser and scan mirror driving circuit 1103 outputs the driving signal 1109 to the scan mirror 304 while it outputs the light emitting trigger 1108 to the laser current source 1104. The laser current source 1104 supplies a current 1110 to the laser light sources 301r, 301g, and 301b in response to the light emitting trigger 1108. The V-SYNC signal 1107 is a pulse signal at 60 Hz, and in the case of a double-speed mode, a light-emitting trigger 1108 at 120 Hz is generated on the basis of the V-SYNC signal 1107. In other words, in the case of an nX-speed mode, a light emitting trigger 1108 at n·60 Hz is generated. A duty ratio that determines light emitting times of the laser light sources 301r, 301g, and 301g is determined by the driving method of the LCOS 310 that is a 2D spatial light modulator. The relation of the V-SYNC signal 1107 and the light emitting trigger 1108 described above is shown in FIG. 10. The phase of the ON timing of the driving signal 1106 of the LCOS 310 shifts gradually as the grayscale comes closer to black. Because the phase of the ON timing of the driving signal 1106 shifts by 920 μs until black is displayed, it is necessary to set the duty ratio of the driving signal 1106 to 33%.

Second Embodiment

A second embodiment of the invention will now be described. In this embodiment, an auto power control (APC) that automatically controls, an output of the semiconductor laser is applied to the 2D image display apparatus of the first embodiment described above. The "droop" occurring when rays of light are emitted sequentially from the semiconductor lasers is improved by automatically controlling outputs of the semiconductor lasers. The configuration of a 2D image display apparatus of this embodiment is shown in FIG. 11.

Figure 11:
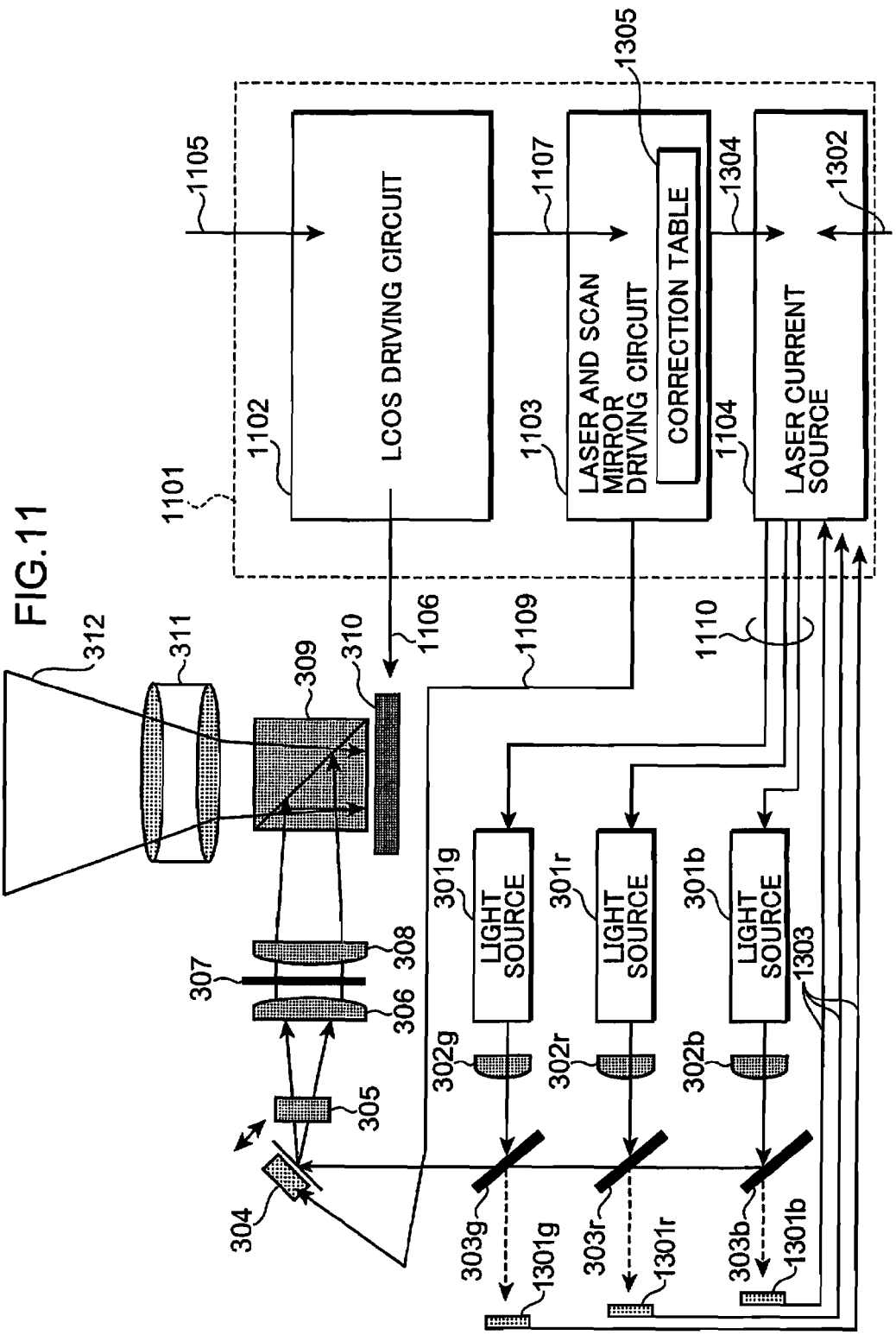
FIG. 11 is a view schematically showing the configuration of a 2D image display apparatus according to a second embodiment of the invention.

The 2D image display apparatus of FIG. 11 is the same as the first embodiment described above in that an LCOS is used as the 2D spatial light modulator 310. In the 2D image display apparatus of this embodiment, outputs from the red, green, and blue semiconductor lasers 301r, 301g, and 301b are monitored by photo detectors 1301r, 1301g, and 1301b, respectively. The photo detectors 1301r, 1301g, and 1301b feed back monitor signals 1303 to the laser current source 1104. The laser current source 1104 multiplies a laser modulation signal 1304 from the laser and scan mirror driving circuit 1103 by output set values 1302 of the respective laser light sources 301r, 301g, and 301b from the outside, and makes the light intensity of each laser light source homogeneous by comparing the products with the monitor signals 1303 from the photo detectors 1301, which makes it possible to suppress the occurrence of a droop.

In this instance, it is recommended that a light intensity correction table 1305 be provided inside the laser and scan mirror driving circuit 1103. The laser and scan mirror driving circuit 1103 then becomes able to correct color irregularities and brightness irregularities resulting from the characteristics of the optical components and the laser light sources by setting the laser modulation signal 1304 by referring to the light intensity correction table 1305. For example, in a case where the center portion is bright and the right and left portions are darker than the center portion on the screen, it is possible to perform homogeneous illumination by increasing an output of the laser light source when the right and left portions on the screen are illuminated. The light intensity correction table 1305 is formed of, for example, a semiconductor memory. Because adjustment data of an output of the laser light source can be set in advice in each apparatus, the optical adjustment can be readily performed.

Figure 13A:
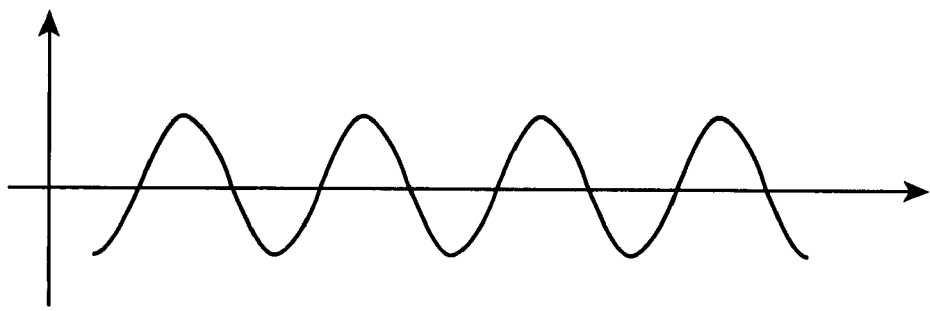
FIG. 13A is a view showing the waveform of a driving signal 1109 of FIG. 12.
Figure 13B:
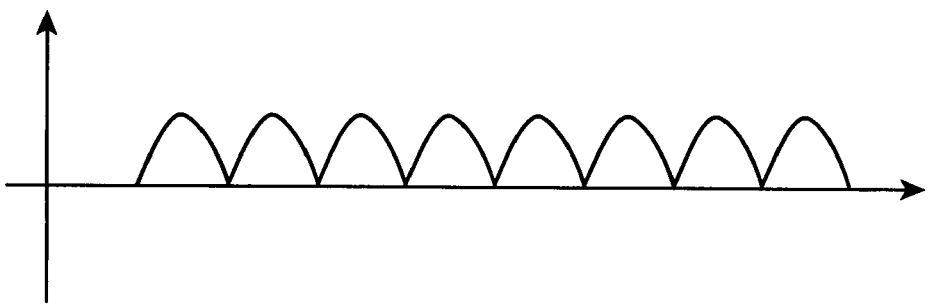
FIG. 13B is a view showing the waveform after the driving signal 1109 of FIG. 13A is full-front rectified.
Figure 13C:
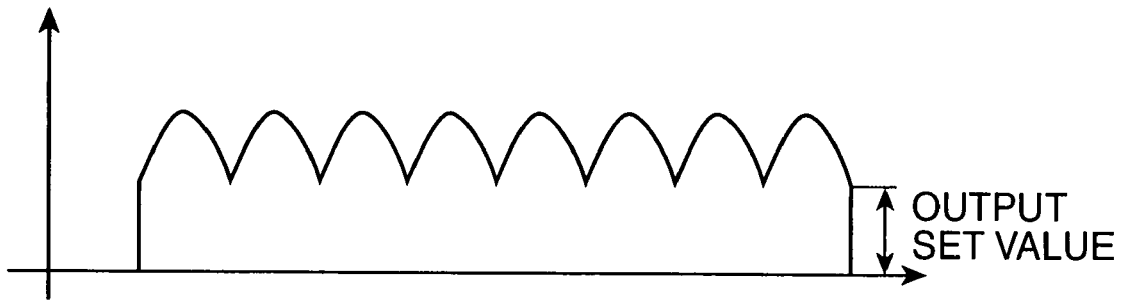
FIG. 13C is a view showing the waveform of a laser modulation signal 1304 generated from the full-front rectified driving signal 1109 of FIG. 13B.

FIG. 12 shows the configuration of the laser and scan mirror driving circuit 1103 provided with a light intensity correction circuit 1306 that replaces the light intensity correction table 1305 described above. The light intensity correction circuit 1306 generates the laser modulation signal 1304 from the driving signal 1109 of the scan mirror 304. For example, upon input of the driving signal 1109 shown in FIG. 13A, the light intensity correction circuit 1306 full-wave rectifies the driving signal 1109. It then generates the laser modulation signal 1304 by adding the output set values 1302 of the respective laser light sources 301r, 301g, and 301b from the outside to the full-wave rectified driving signal 1109 shown in FIG. 13B. This configuration enables homogeneous illumination to be achieved without increasing the costs of components.

Third Embodiment

Figure 14:
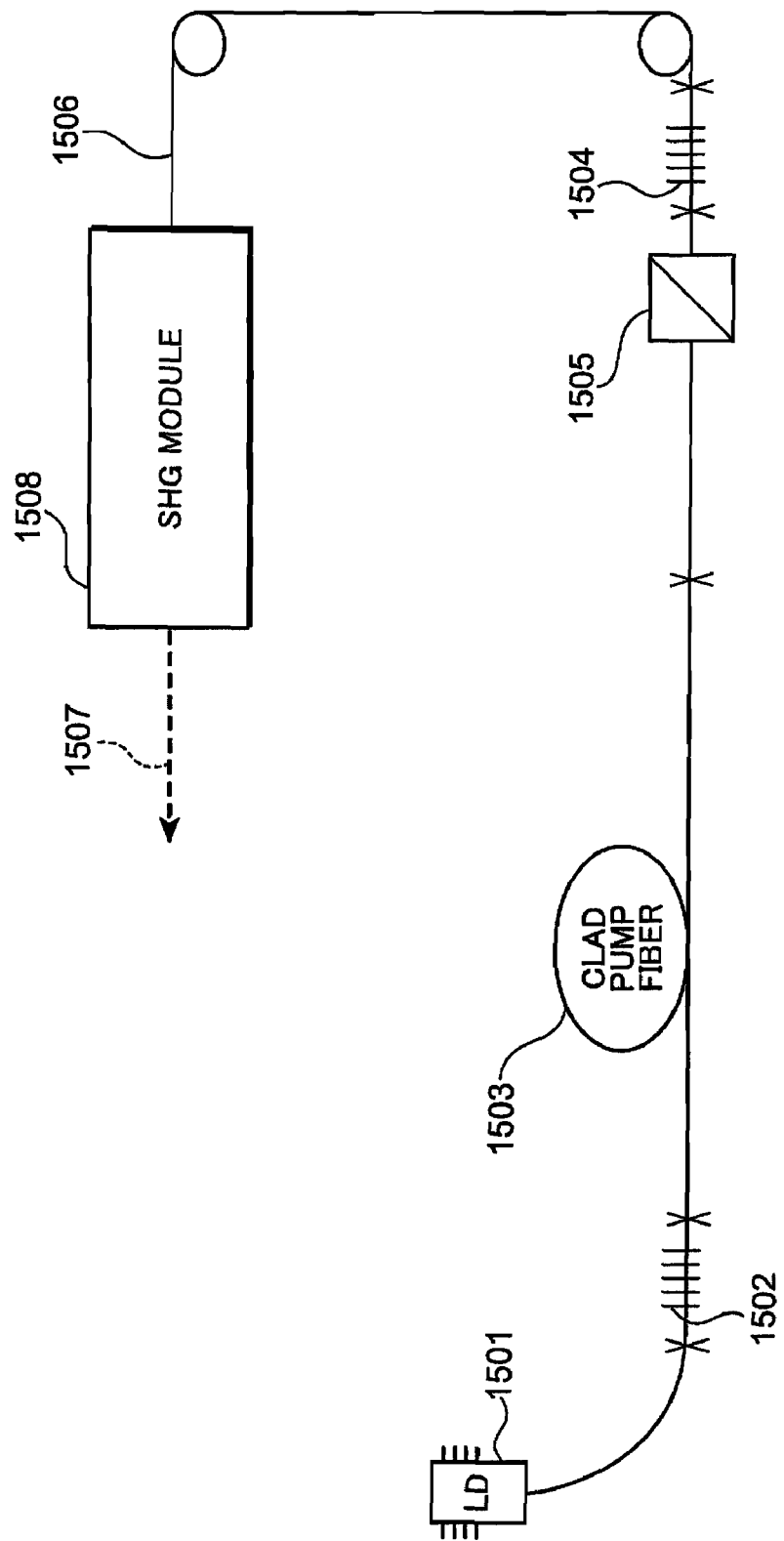
FIG. 14 is a view schematically showing the configuration of a fiber laser used as a green semiconductor laser in a 2D image display apparatus according to a third embodiment of the invention.

A third embodiment of the invention will now be described. A 2D image display apparatus according to this embodiment of the invention is an embodiment where a second harmonic of a fiber laser is used as the green semiconductor laser light source in the first and second embodiments described above. FIG. 14 shows the configuration of a fiber laser used as the green semiconductor laser of the 2D image display apparatus of this embodiment.

Laser light emitted from an exciting (pumping) LD 1501 is let go incident on a rear-earth-doped clad pump fiber 1503, which is a laser medium, and the laser light starts to oscillate as it is resonated inside a laser resonator formed of fiber gratings 1502 and 1504, which are reflection mirrors. A polarizer 1505 is inserted in order to direct the oscillated laser light to a single polarization direction. The fiber laser has a good beam quality, and is able to define the oscillation wavelength spectrum to the line width of reflection spectrum in the fiber grating 1504 on the outgoing side. The fiber laser is therefore quite suitable for a fundamental wave light source of a harmonic generator (referred to as the wavelength converting light source) using non-linear optical crystal. A second harmonic generator (SHG) module 1508 is a mechanism that generates a second harmonic, and a two times higher second harmonic 1507 goes out as a result of the use of this mechanism.

In a case where the fiber laser is modulated, there are roughly two methods as follows:

(1) a method adopting the configuration of a fiber amplifier to amplify modulated seed light; and (2) a method of modulating intensity of exciting light.

Figure 15B:
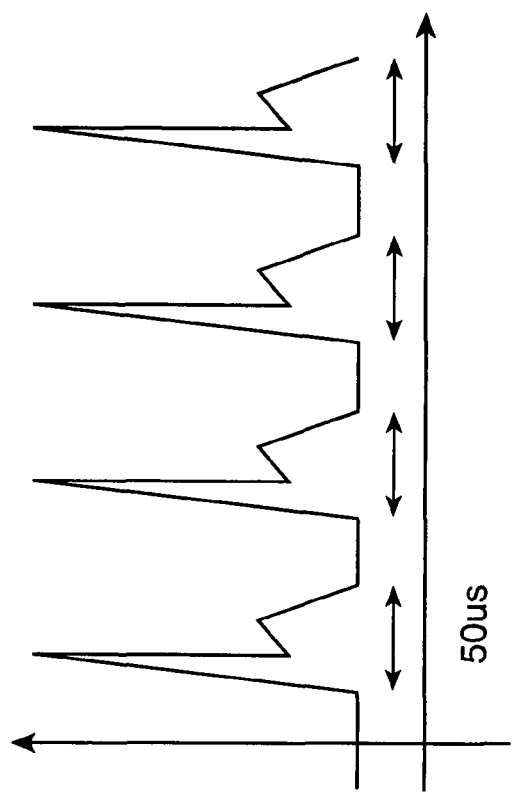
FIG. 15B is a view showing an output waveform of a higher harmonic of the laser fiber.
Figure 15A:
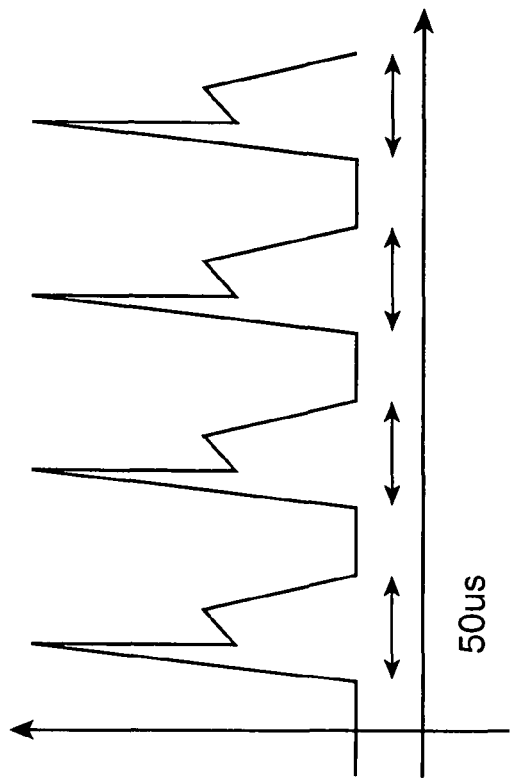
FIG. 15A is a view showing an output waveform of a fundamental wave of the fiber laser.

According to the method (1), because a modulation operation can be performed at a high speed, it is possible to suppress a droop described in the second embodiment above. However, the laser as the seed light is expensive and the cost remains as an issue. Meanwhile, the method (2) is advantageous in terms of the cost. However, the generation of a giant pulse at the rising of the fundamental wave and a second harmonic remains as an issue. FIGS. 15A and 15B show the giant pulse. The occurrence of the giant pulse makes it impossible to use the auto power control (APC) to improve the droop described in the second embodiment. Hence, by pulse-driving the fiber laser at about 10 kHz and adopting the FM modulation as the modulation method for adjusting an output, it is possible to maintain light intensity at the constant level within the lighting time of the laser light source. By adopting this configuration, it is possible to utilize the giant pulse at the time of wavelength conversion, which can enhance the conversion efficiency to green light. FIG. 16 shows the modulation wavelength of this embodiment. Referring to FIG. 16, the top row shows the light emitting timing of the laser light source and the bottom row shows an output of a second harmonic. The configuration of this embodiment to use the fiber laser as the green semiconductor laser is also applicable in a fourth embodiment below.

As has been described, according to the first through third embodiments of the invention, it is possible to avoid a bright line, irregularities in brightness, and contrast deterioration.

By a combination with the diffusing plate having the angle of diffusion at 3 degrees or greater, the halftone can be expressed better. It is thus possible to increase the contrast.

In the first through third embodiments above, the LCOS is used as the 2D spatial light modulator. However, it is also possible to use a micro electromechanical system element (MEMS element) for digital modulation represented by a digital micromirror device (DMD).

In the first through third embodiments, the field sequential method by which rays of red, green, and blue laser light are sequentially lit ON has been described as the illumination method for the 2D spatial light modulator. However, it is also possible to use the scroll illumination by which illumination is performed by displacing the irradiation positions in the respective colors. By using the scroll illumination, it is possible to extend the light emitting time, which can in turn enhance the luminance on the screen surface.

In the first through third embodiments, it is possible to prevent high-intensity laser light from being irradiated to the 2D spatial light modulator by setting the scan mirror to start operating before laser light is emitted from the laser light source. It is therefore possible to protect the 2D spatial light modulator from damages caused by the laser.

When a 2D spatial light modulator of digital grayscale is used, there is a problem that the grayscale deteriorates by the scan illumination. However, as with the first through third embodiments above, by using the diffusing plate, it is possible to extend the illumination time per unit region and to accelerate the scan mirror. It is thus possible to achieve the effect of extending the illumination time per unit region by accelerating the scan mirror, which can in turn suppress deterioration of the grayscale.

The first through third embodiments described above are not limited to the 2D image display apparatus, and they can be used for sensing, such as a distance image sensor using a modulated infrared ray.

It goes without saying that the 2D image display apparatus described in each embodiment above is a mere example, and the invention can be implemented in another embodiment as well.

Fourth Embodiment

A fourth embodiment of the invention will now be described. In the first through third embodiments, illumination light is irradiated several times on the spatial light modulator by scanning the scan mirror several times within the lighting time of the laser light source. In contrast to this configuration, in this embodiment, in a case where the spatial light modulator that performs a grayscale display by the time modulation is used, the scan direction in which illumination light irradiates the spatial light modulator is inverted with respect to a continuous lighting time of the laser light source.

Figure 17:
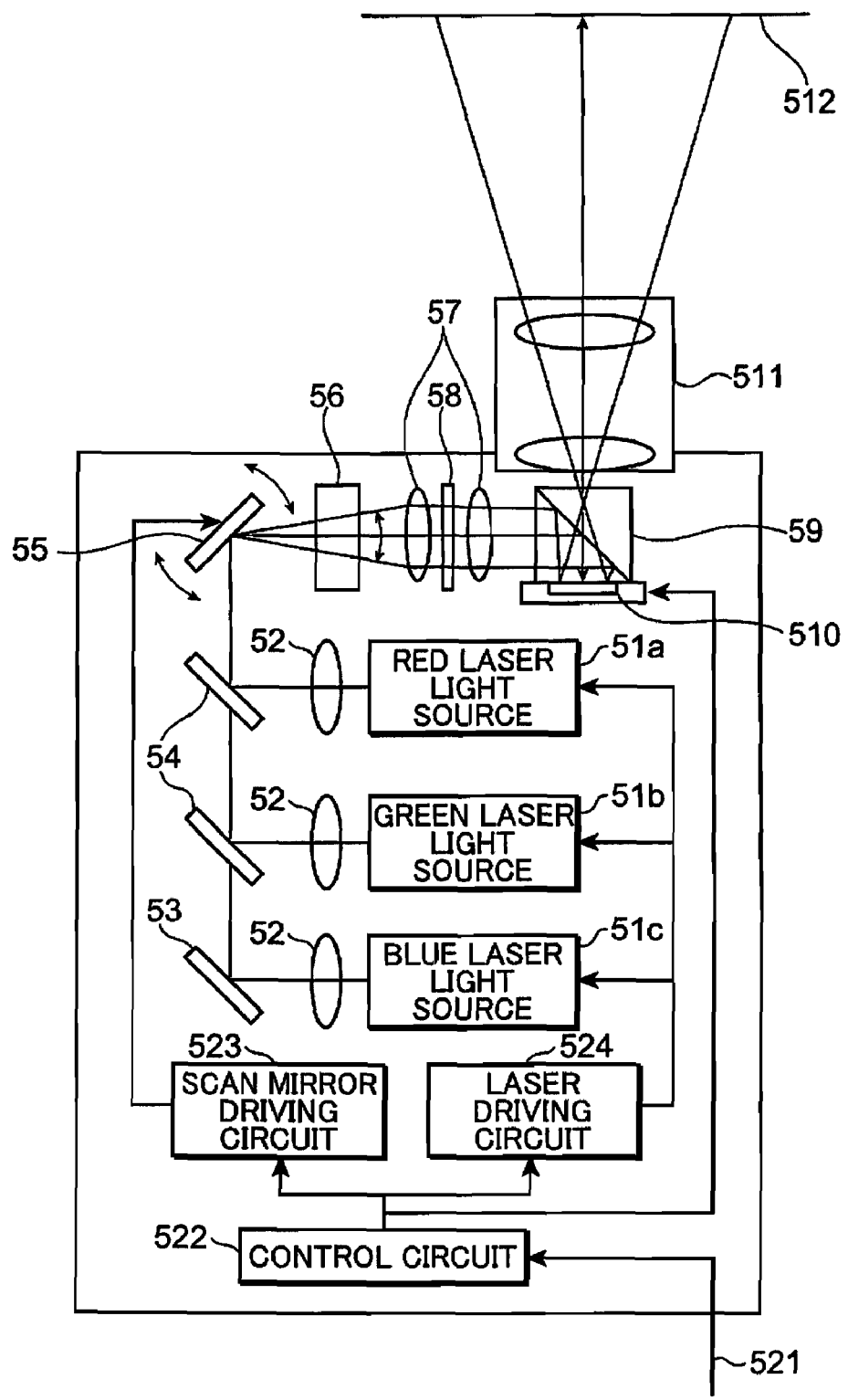
FIG. 17 is a view schematically showing the configuration of a 2D image display apparatus according to a fourth embodiment of the invention.

FIG. 17 is a view schematically showing the configuration of a 2D image display apparatus of this embodiment. The 2D image display apparatus of this embodiment includes a red laser light source 51a, a green laser light source 51b, a blue laser light source 51c, collimate lenses 52, a mirror 53, dichroic mirrors 54, a scan mirror 55, a concave lens 56, field lenses 57, a diffusing plate 58, a polarized beam splitter 59, a 2D spatial light modulator 510, a projection lens 511, and a screen 512.

Rays of light emitted from the red laser light source 51a, the green laser light source 51b, and the blue laser light source 51c are made into rays of parallel light by the collimate lens 52 and reflected on the mirror 53 or the dichroic mirrors 54. The respective rays of laser light are combined into a single beam, which is guided to the scan mirror 55 serving as beam scanning means. The scan mirror 55 is typically an electromagnetically-driven resonant mirror.

The beam reflected on the scan mirror 55 is expanded in a 1D direction (a direction perpendicular to the sheet surface of FIG. 17) by the concave lens 56 to form a linear beam, and irradiates the spatial light modulator 510 by passing through the field lenses 57, the diffusing plate 58, and the polarized beam splitter 59. The spatial light modulator 510 is driven by a control circuit 522 according to a video signal 521 inputted therein to modulate an illumination beam by being switched ON/OFF pixel by pixel. With the light having irradiated an ON pixel, the polarization is rotated. The light then passes through the polarization beam splitter 59 and is irradiated onto the screen 512 by the projection lens 511 for an image to be displayed thereon.

Herein, a linear beam expanding in the longitudinal direction of an image illuminates the whole image as the beam is scanned in the crosswise direction of the image. At the same time, by scanning the beam via the diffusing plate 58, the angle of incidence of light irradiated to each pixel in the spatial light modulator 510 varies from time to time. This makes it possible to achieve the effect of reducing the speckle noises of the projected image.

The control circuit 522 controls the lighting timing of the respective laser light sources 51a, 51b, and 51c by sending the synchronization signal obtained from the video signal 521 to a laser driving circuit 524, and also drives the scan mirror 55 in synchronization with the lighting timing by means of a scan mirror driving circuit 523.

The scan mirror 55 is driven to resonate at a constant frequency. It is sufficient that the driving frequency is at least as high as the frame rate of a display image or higher. However, because the projected image varies in various manners due to the relation with the timing at which the spatial light modulator 510 displays an image, it is necessary to choose a frequency at which a satisfactory image can be projected.

Hereinafter, operations of an image display apparatus 100 of this embodiment will be described.

Figure 18A:
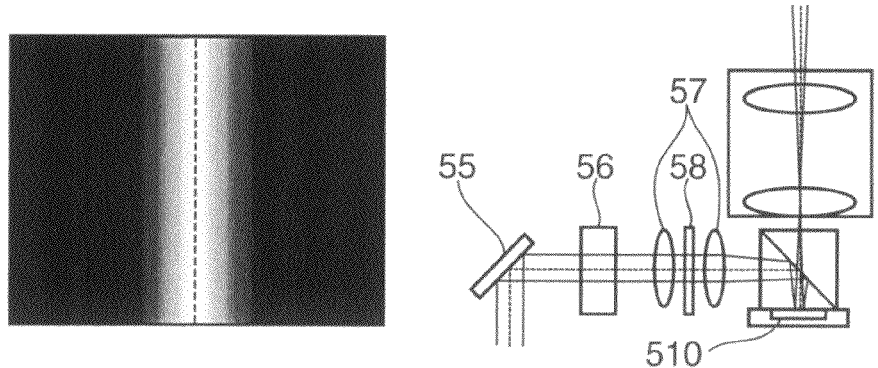
FIG. 18A is a view showing the appearance of illumination light in a state where a scan mirror 55 of FIG. 17 is at the neutral position and a diffusing plate 58 is omitted.

FIGS. 18A through 18D are views showing the relations of a beam scan and a projected image in the image display apparatus of this embodiment. FIG. 18A shows a state where the scan mirror 55 is at the neutral position while the diffusing plate 58 is omitted and the appearance of illumination light in this state. The illumination light is expanded vertically and focused in the horizontal direction by the concave lens 56 and made into a narrow linear beam, which irradiates the center of the screen.

Figure 18B:
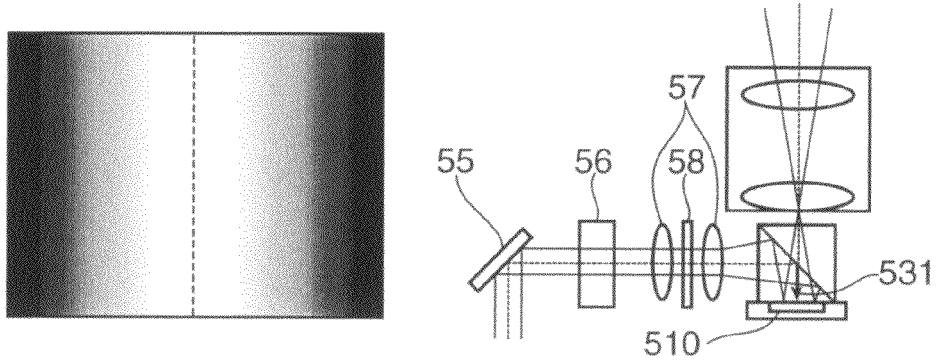
FIG. 18B is a view showing the appearance of illumination light in a state where the scan mirror 55 is at the neutral position and a beam passes through the diffusing plate 58.

FIG. 18B shows a state where the scan mirror 55 is at the neutral position as with FIG. 18A and the light passes through the diffusing plate 58. A diffused beam is expanded in width and irradiates the center portion of the screen widely. In this instance, the optical axis of the beam falls on the center of the screen and light 531 irradiating the center of the screen falls on the spatial light modulator 510 perpendicularly.

Figure 18C:
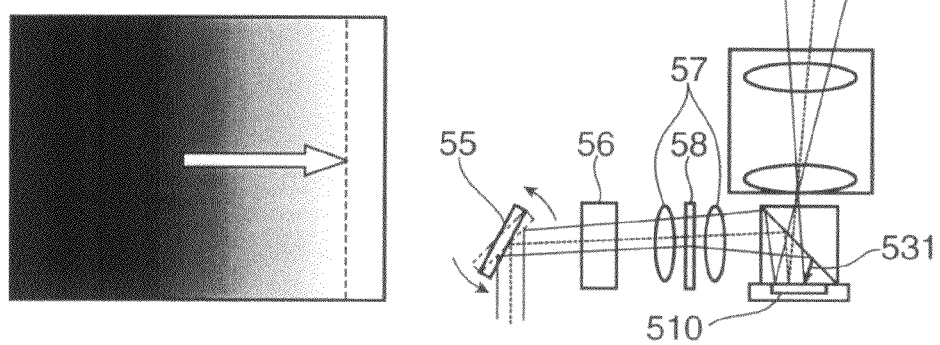
FIG. 18C is a view showing the appearance of illumination light in a state where the scan mirror 55 is driven in one direction and the optical axis of the beam has reached the right end of the screen.

FIG. 18C shows a state where the scan mirror 55 is driven in one direction and the optical axis of the beam has reached the right end of the screen. In this instance, the optical axis of the beam deviates from the center of the screen, and light 531 irradiating the center of the screen is light of the beam at one end and falls on the spatial light modulator 510 diagonally.

Figure 18D:
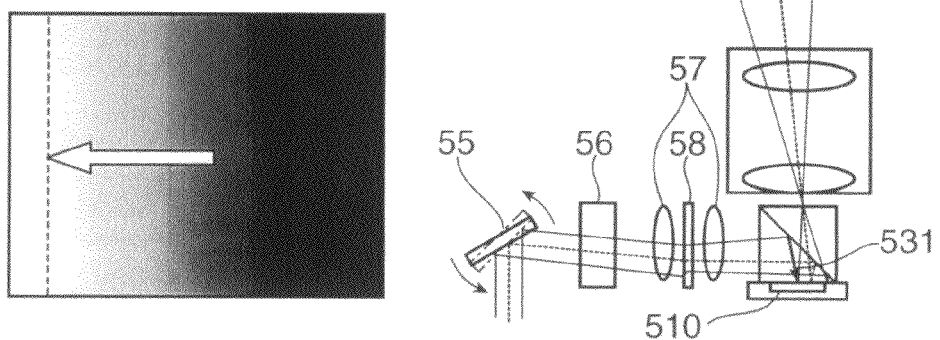
FIG. 18D is a view showing the appearance of illumination light in a state where the scan mirror 55 is driven in a direction opposite to the direction in FIG. 18C and the optical axis of the beam has reached the left end of the screen.

FIG. 18D shows a state where the scan mirror 55 is driven in a direction opposite to the direction in the case of FIG. 18C and the optical axis of the beam has reached the left end of the screen. In this instance, the optical axis of the beam deviates from the center of the screen in a direction opposite to the direction in the case of FIG. 18C, and light 531 irradiating the center of the screen is light of the beam at the other end and falls on the spatial light modulator 510 diagonally from a direction opposite to the direction in the case described above.

As has been described, by irradiating the beam diffused by the diffusing plate 58 to the spatial light modulator 510 by scanning the beam, the angle of incidence of the light that irradiates each pixel of the screen varies from time to time, which makes it possible to reduce the speckle noises of the projected image effectively. In addition, because the diffused beam has a constant width, there is no need to expand the amplitude of the beam scan to the full width of the screen. Hence, by setting the amplitude of the beam scan to about 70 to 80% of the full width of the screen, it is possible to illuminate almost the entire surface of the screen equally.

This configuration makes it possible to realize a compact and simple illumination optical system achieving both homogenization and the effect of reducing the speckle noises.

The relation of the image display timing and the beam scan will now be described.

Figure 19A:
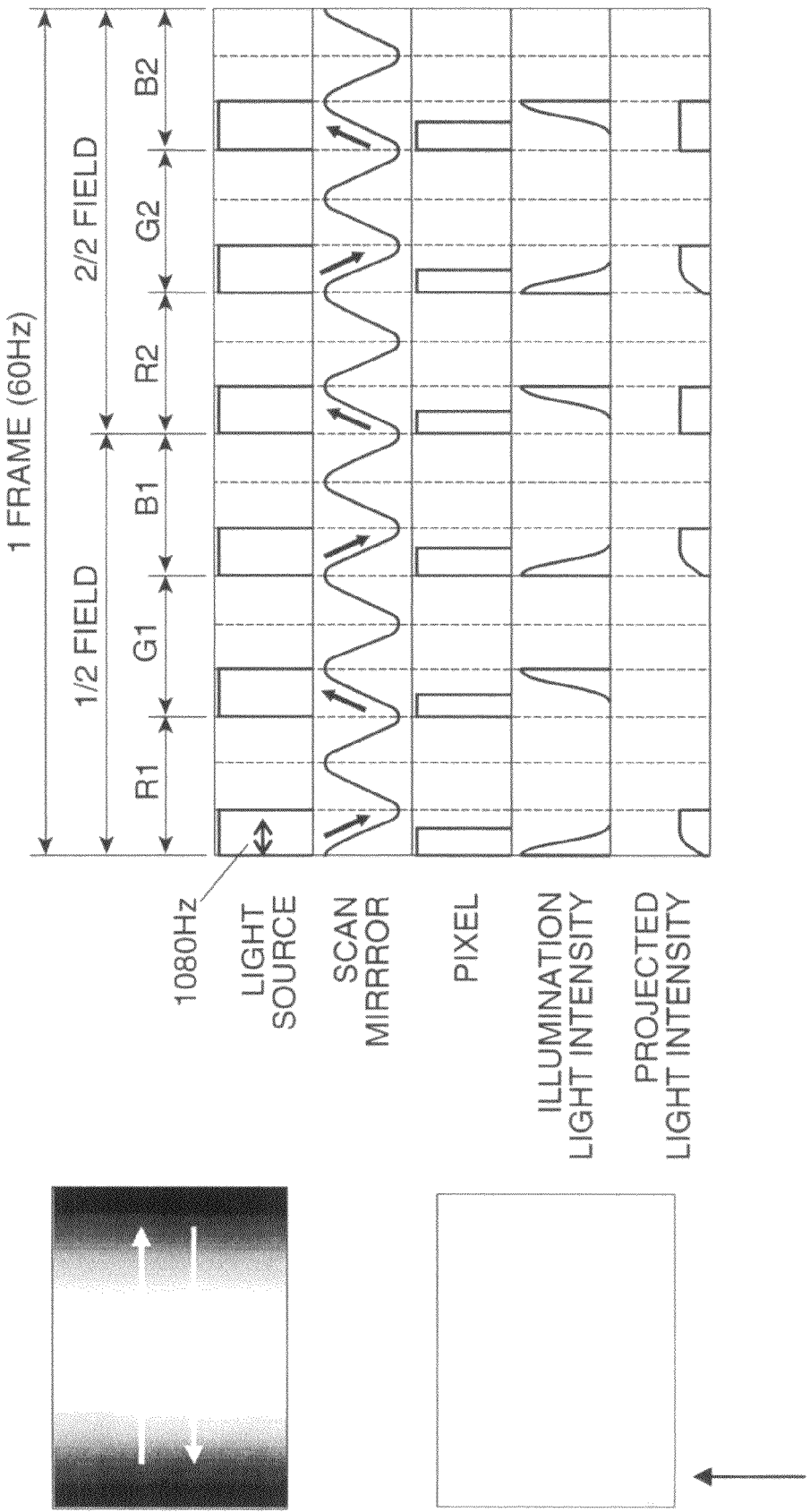
FIGS. 19A through 19C are timing charts used to describe operations of the image display apparatus of the fourth embodiment, FIG. 19A being a timing chart for pixels in the vicinity of the left end of the screen, FIG. 19B being a timing chart for pixels in the vicinity of the center of the screen, and FIG. 19C being a timing chart for pixels in the vicinity of the right end of the screen.
Figure 19B:
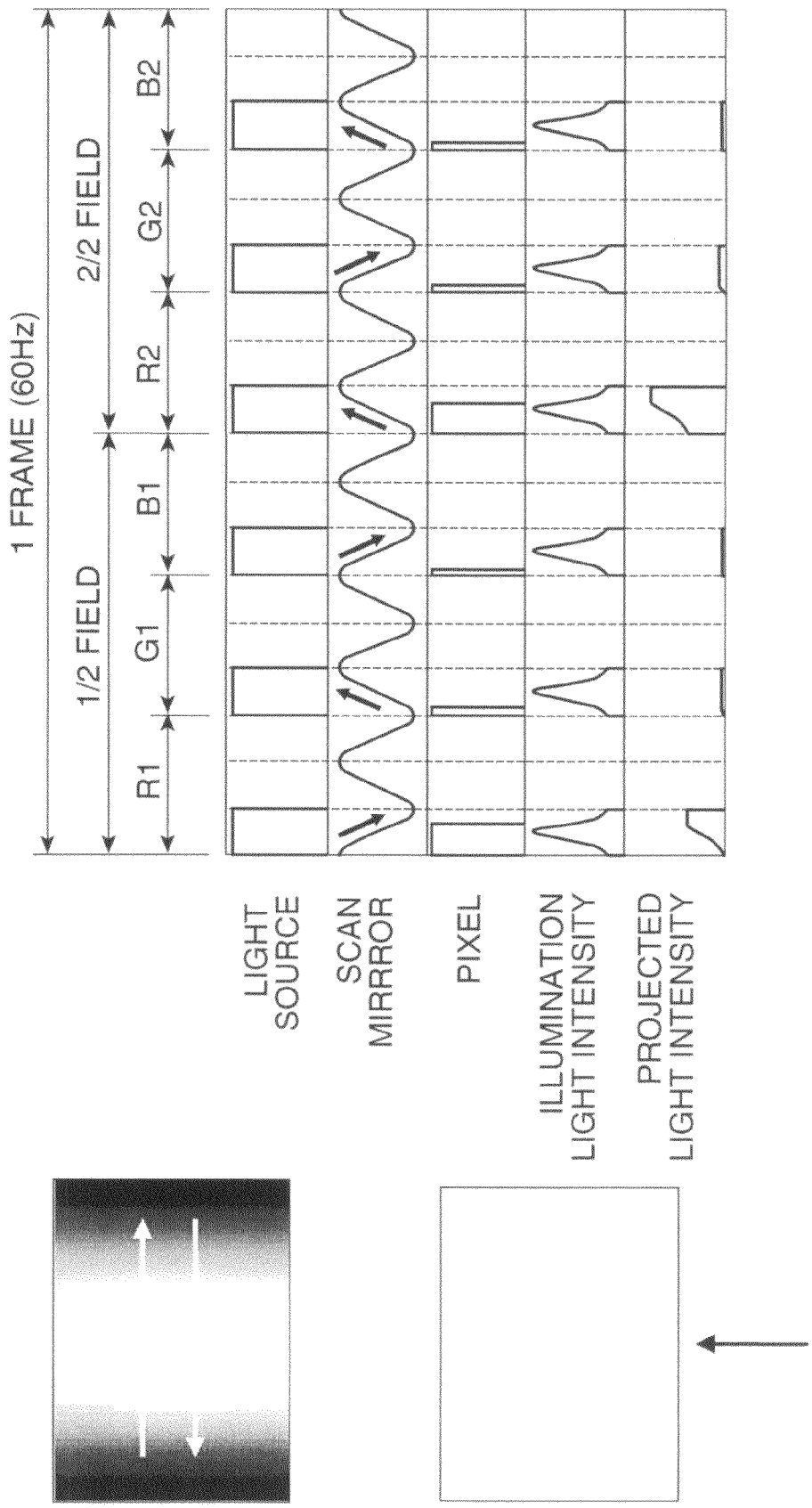
Figure 19C:
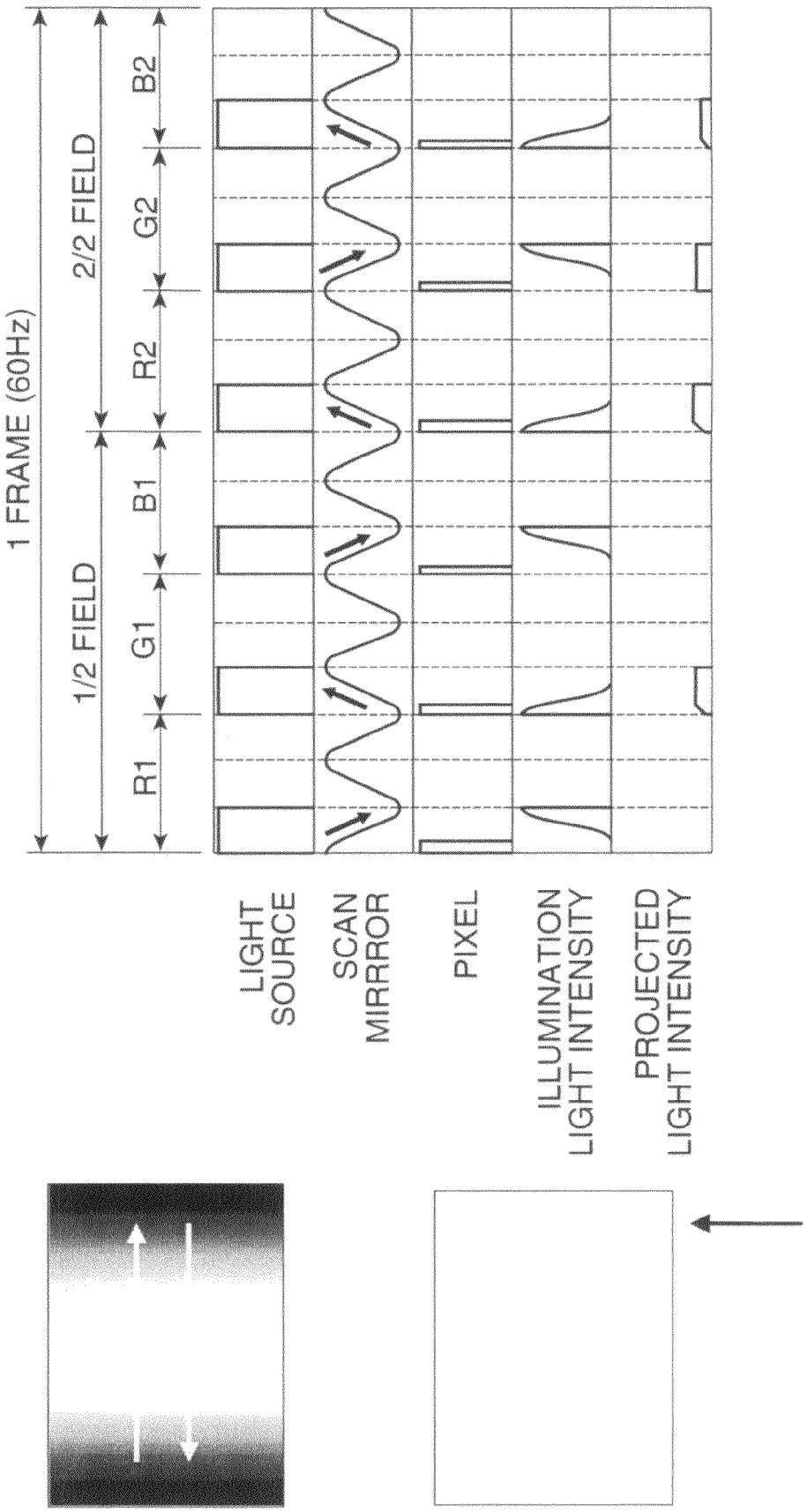

FIGS. 19A through 19C are timing charts used to describe operations of the image display apparatus of this embodiment. In the respective timing charts of FIGS. 19A through 19C, the first row shows the lighting timing of the respective laser light sources 51a, 51b, and 51c. The second row shows the driving waveform of the scan mirror 55. The third row shows the pixel value of a single pixel of the SLM (spatial light modulator) 510. The fourth row shows the illumination light intensity irradiated to the pixel. The fifth row shows the projected light intensity of the pixel.

In FIGS. 19A through 19C, one frame of the image is divided to two fields, and the same frame image is displayed two times (½ field and ⅔ field). Further, in each field, three color fields in RGB are displayed at the duty of ⅓ (R1 to 2, G1 to 2, and B1 to 2).

In a case where the frame rate is 60 Hz, the field rate is 120 Hz and the color field rate is 360 Hz, which is further tripled to 1080 Hz in the lighting periods of the laser light sources 51$a$, 51$b$, and 51$c$ for the respective colors.

In contrast to this configuration, the driving frequency of the scan mirror 55 is reduced to 540 Hz, which is half the frequency of the laser light sources 51$a$, 51$b$, and 51$c$, and further, the phase of the driving of the scan mirror 55 is brought into coincidence with the phase of the lighting of the laser light sources 51$a$, 51$b$, and 51$c$. When configured in this manner, as are shown in FIGS. 19A through 19C, a scan of the illumination light by the scan mirror 55 during the lighting period of the laser light sources 51$a$, 51$b$, and 51$c$ becomes a one-way scan from one end to the other end of the screen. Herein, as has been described, the lighting duty of the color fields for the respective colors is set to ⅓. Hence, as is indicated by an arrow in the second row in each of FIGS. 19A through 19C, the direction in which the illumination light scans the screen inverts in each continuous lighting period. Further, the scan direction inverts between the ½ field and the ⅔ field of the respective colors. In a case where the lighting duty is set to ½, the scan direction becomes the same in all the lighting periods.

During each lighting period, each pixel of the spatial light modulator 510 displays the grayscale as the ON time width is modulated according to the image data. In other words, it is controlled in such a manner that the ON time becomes longer for a color with a high pixel value and the ON time becomes shorter for a color having a low pixel value.

Further, the illumination light intensity irradiated to the pixel varies with the scan timing depending on the position within the screen. For example, as is shown in FIG. 19A, with pixels in close proximity to the left end of the screen, the peak occurs at the beginning and the end of the lighting period. As is shown in FIG. 19B, with pixels in the vicinity of the center of the screen, the peak occurs at the center of the lighting period. Likewise, as is shown in FIG. 19C, with pixels in close proximity to the right end of the screen, the peak occurs at the beginning and the end of the lighting period at the timing opposite to the timing in the case of FIG. 19A.

In this manner, the projected light intensity is determined by the ON timing of each pixel and the timing of the illumination light intensity. Even when the pixel value is the same, the grayscale actually displayed varies with the timing of illumination light, that is, the position on the screen.

The projected image obtained by scanning the illumination light as described above was simulated to find an error from the original image.

Figure 20:
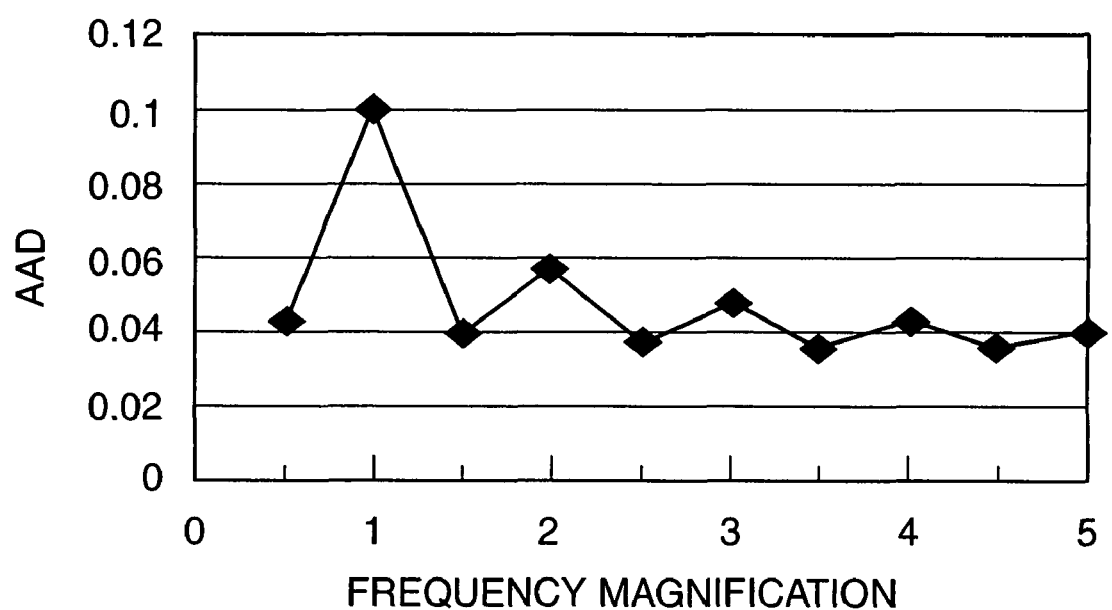
FIG. 20 is a view showing the relation of a frequency magnification and an AAD.

As the scan condition of the scan mirror 55, frequency magnification=scan mirror driving frequency/light source lighting period frequency is varied, and as the index of an error, AAD=average of absolute values of differences=sum of absolute values of differences of respective pixel values of original image and scan image/number of pixel/255 is used. The calculation result for a given image is set forth in FIG. 20.

The error is reduced by increasing the driving frequency of the scan mirror 55. However, the error is smaller by setting the frequency magnification to n−0.5 (n=1, 2, 3, and so on) than by setting it to an integral multiple. When the magnification is n−0.5 times, because the scan direction inverts in each lighting period, one frame is formed as inverse changes in grayscale resulted from the scan overlap in two fields, which makes it possible to achieve an effect of making the error laterally equal and making the error less noticeable through diffusion. Contrarily, the error with the magnification of one becomes particularly large. This occurs at the timing of one reciprocal scan during the lighting period, and the scan is repeated in the same direction during all the lighting periods. Hence, although illumination light can be made homogenous in the respective lighting periods, there is no superimposing effect of the opposite directions. Changes in grayscale on the right and the left therefore differ markedly in the resulting image, and the image is in a state where the error is significant.

Increasing the driving frequency of the scan mirror 55 requires large power to drive the scan mirror 55 and vibrations and noises readily occur. Hence, it is most appropriate to increase the frequency by 0.5 times, at which a satisfactory image is obtained at the lowest frequency.

Figure 21A:
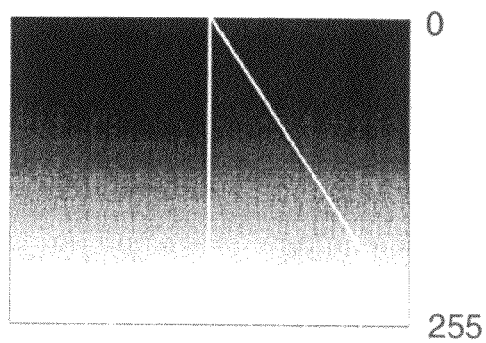
FIG. 21A is a view showing a linear grayscale image in the vertical direction.
Figure 21B:
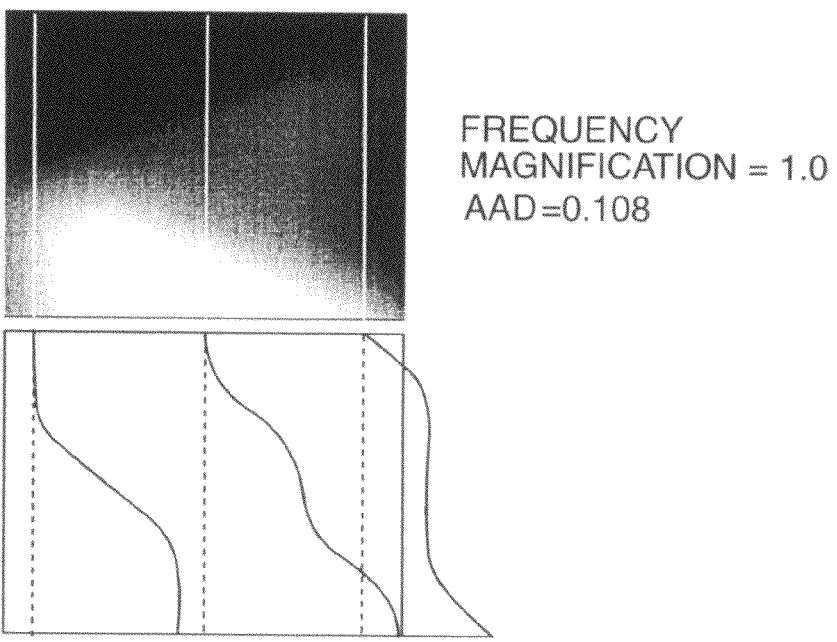
FIG. 21B is a view showing the calculation result in a case where a scan is made at the frequency magnification of 1.
Figure 21C:
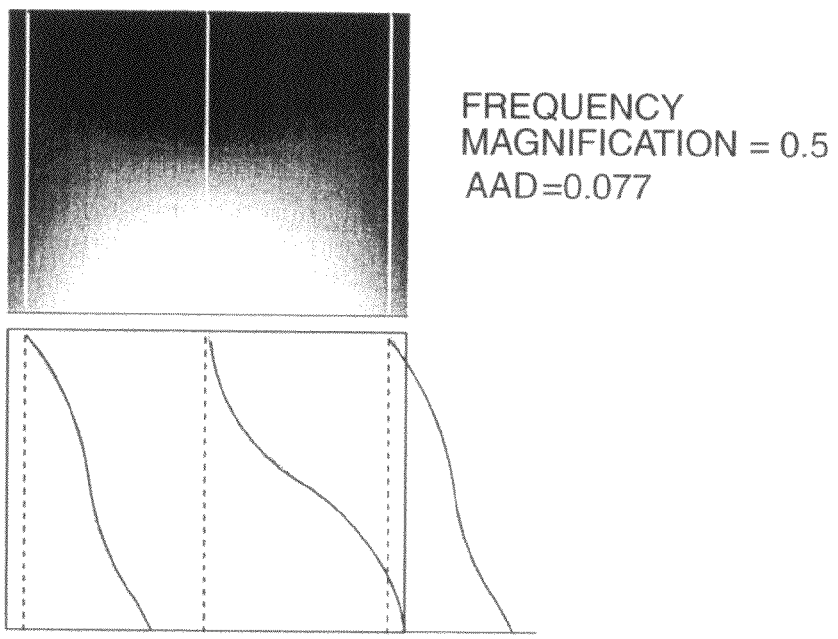
FIG. 21C is a view showing the calculation result in a case where a scan is made at the frequency magnification of 0.5.

The calculation results of a projected image when the grayscale is scanned are set forth in FIGS. 21A through 21C. FIG. 21A shows an original image, which is a linear grayscale image in the vertical direction with the top end being black at the pixel value=0 and the bottom end being white at the pixel value=255. FIG. 21B shows the calculation result when the original image is scanned at the frequency magnification of one. The pixel values on the longitudinal lines on the left, at the center, and on the right of the screen are plotted. FIG. 21C shows the calculation result when the original image is scanned at the frequency magnification of 0.5. The pixel values on the longitudinal lines on the left, at the center, and on the right of the screen are also plotted.

As can be understood from these results, the linear grayscale undergoes different grayscale changes depending on the locations and draws different tone curves as the result of the scan. In a case where the magnification is set to 1, the grayscale undergoes laterally unbalanced grayscale changes, and the error is as large as 0.108. The tone curves in the respective portions are of extreme shapes, which are difficult to correct.

Meanwhile, in a case where the magnification is set to 0.5, the resulting image is symmetrical and the error is as small as 0.077. The curves are relatively smooth, which can be readily correct.

In view of these results, by calculating tone curves that differ with the positions in the image as many as crosswise pixels of the image and finding an amount of correction needed for inverse transformation for each, it is possible to correct the original image. In order to enable a correction at high accuracy, it is necessary to perform processing with the number of bits equal to or greater than the number of grayscale bits. However, by previously choosing the scan condition under which an error becomes small, it is possible to make a satisfactory correction using a relatively small number of bits. By scanning the image thus corrected, it is possible to obtain a projected image close to the original image to the extent possible.

Figure 22A:
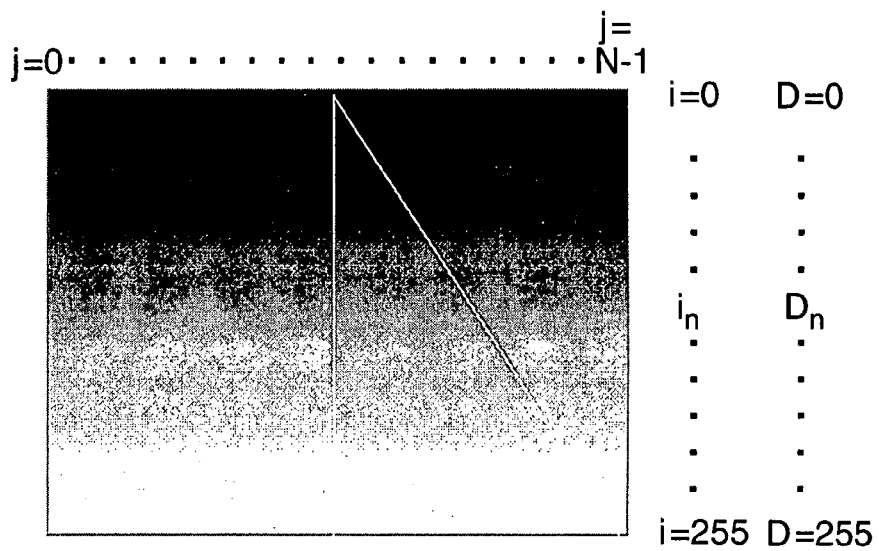
FIG. 22A is a view showing a linear grayscale image in the vertical direction.
Figure 22B:
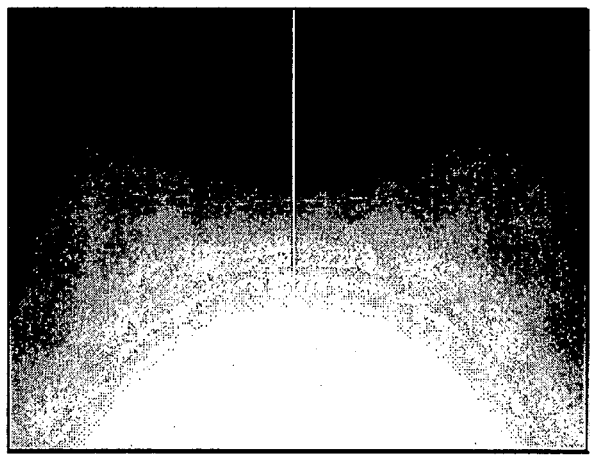
FIG. 22B is a view showing the calculation result in a case where a scan is made at the frequency magnification of 0.5.
Figure 22C:
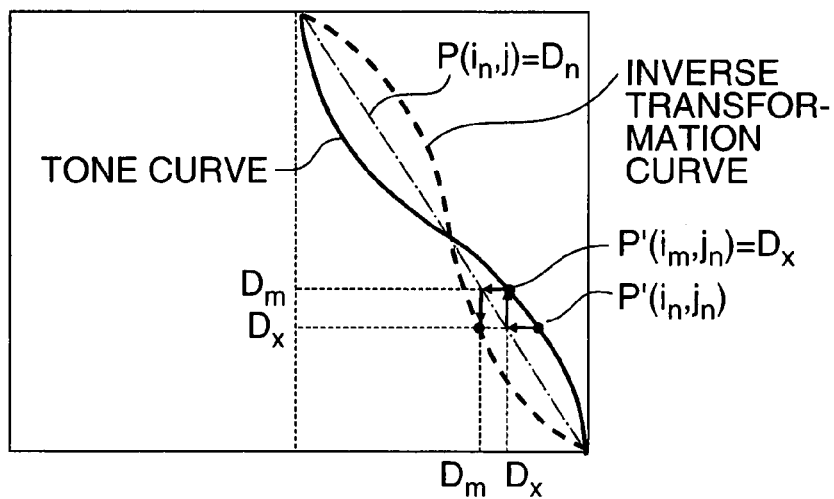
FIG. 22C is a view used to describe the procedure to find an inverse transformation curve from a tone curve.

The processing procedure of the correction described above will now be described using FIGS. 22A through 22C. FIG. 22A shows an original image, which is a linear grayscale image in the vertical direction with the top end being black at the pixel value D=0 and the bottom end being white at the pixel value D=255. FIG. 22B shows the calculation result when the original image of FIG. 22A is scanned at the frequency magnification of 0.5. FIG. 22C is a view used to describe the procedure to find the inverse transformation curve described above from the tone curve of FIG. 22B.

As is shown in FIG. 22A, the original image is a vertical grayscale image formed of N pixels in the horizontal direction×256 pixels in the vertical direction. Herein, let P($i_n$, $j_n$) be the pixel value of a pixel at the coordinate($i_n$, $j_n$) of the original image of FIG. 22A. Because the original image of FIG. 22A is a vertical grayscale image, $P(i_n, i_n)$ is given as $D_n$.

A case where the pixel value $D_n=P(i_n, i_n)$ of the pixel at the coordinate $(i_n, i_n)$ is converted to $D_x=P'(i_n, j_n)$ by a scan will be described. In this case, the coordinate $(i_m, j_n)$ having the pixel value $D_x$ on the tone curve is found, and the pixel value $D_m$ at the coordinate $(i_m, i_n)$ of the original image of FIG. 22A is found. It is sufficient to set an amount of correction, $D_m$, for the pixel value of the pixel at the coordinate $(i_n, i_n)$ as the amount of correction described above. By applying this amount of correction to each pixel, it is possible to obtain an inverse transformation curve symmetrical with the tone curve for $P(i_n, j_n)=D_n$.

By setting the amount of correction, it is possible to correct the conversion of the pixel value, from $D_n$ to $D_x$, of the pixel at the coordinate $(i_n, j_n)$ by the scan. By previously saving this amount of correction for N pixels in the horizontal direction, it is possible to apply the correction described above to a given pixel.

Further, the error can be further smaller by controlling the ON timing of the pixel to synchronize with the timing of the beam scan. Because the scan beam moves in the shape of a sine curve during each lighting period, it is possible to pre-calculate the timing at which it reaches a given position on the screen. The ON timing of the pixel can be therefore controlled according to this calculation result.

When the original image is corrected in this state by calculating the amount of correction in the same manner using the scan result of the grayscale image as described above, the error can be further reduced.

The configuration of this embodiment to correct the grayscale image is also applicable in the first through third embodiments above.

In this embodiment, simple time width modulation has been described. However, the embodiment is also applicable to a case where ON/OFF switching is repeated more finely by generating a bit pattern as the digital grayscale display method.

Figure 23:
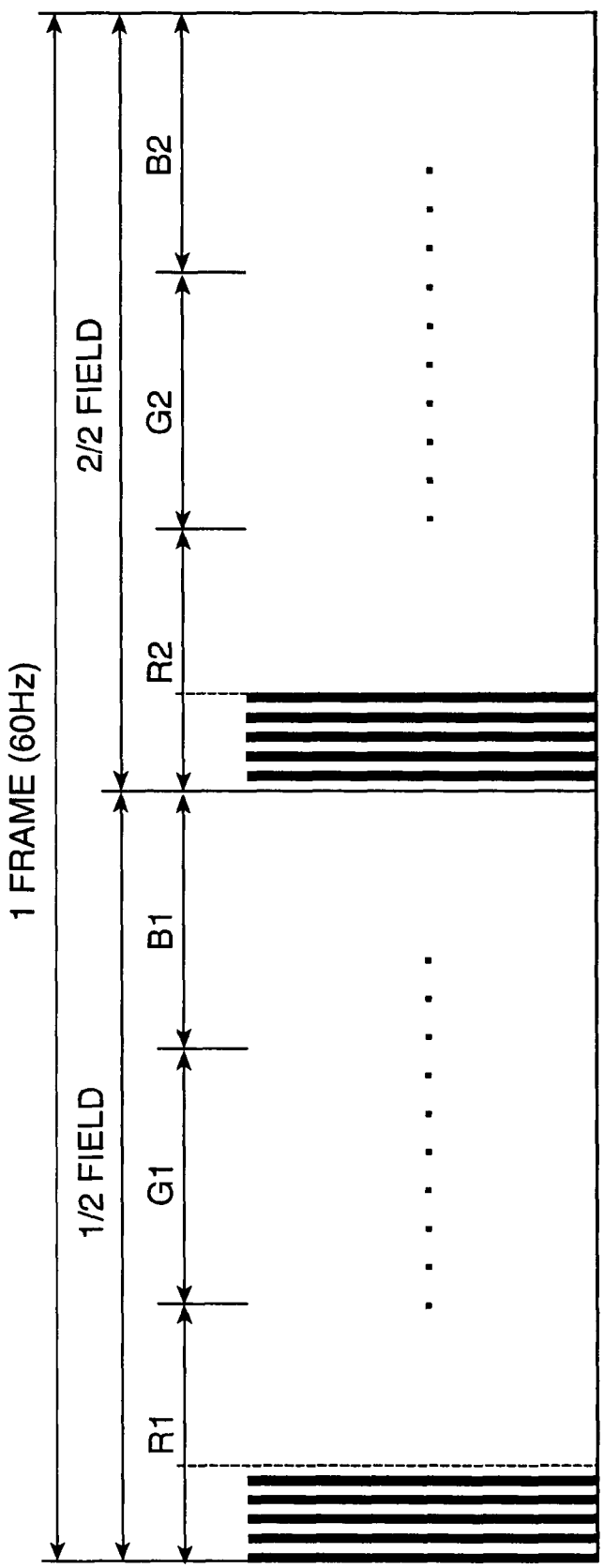
FIG. 23 is a view used to describe a case where a red laser light source 51a is driven in pulsed oscillation.
Figure 24:
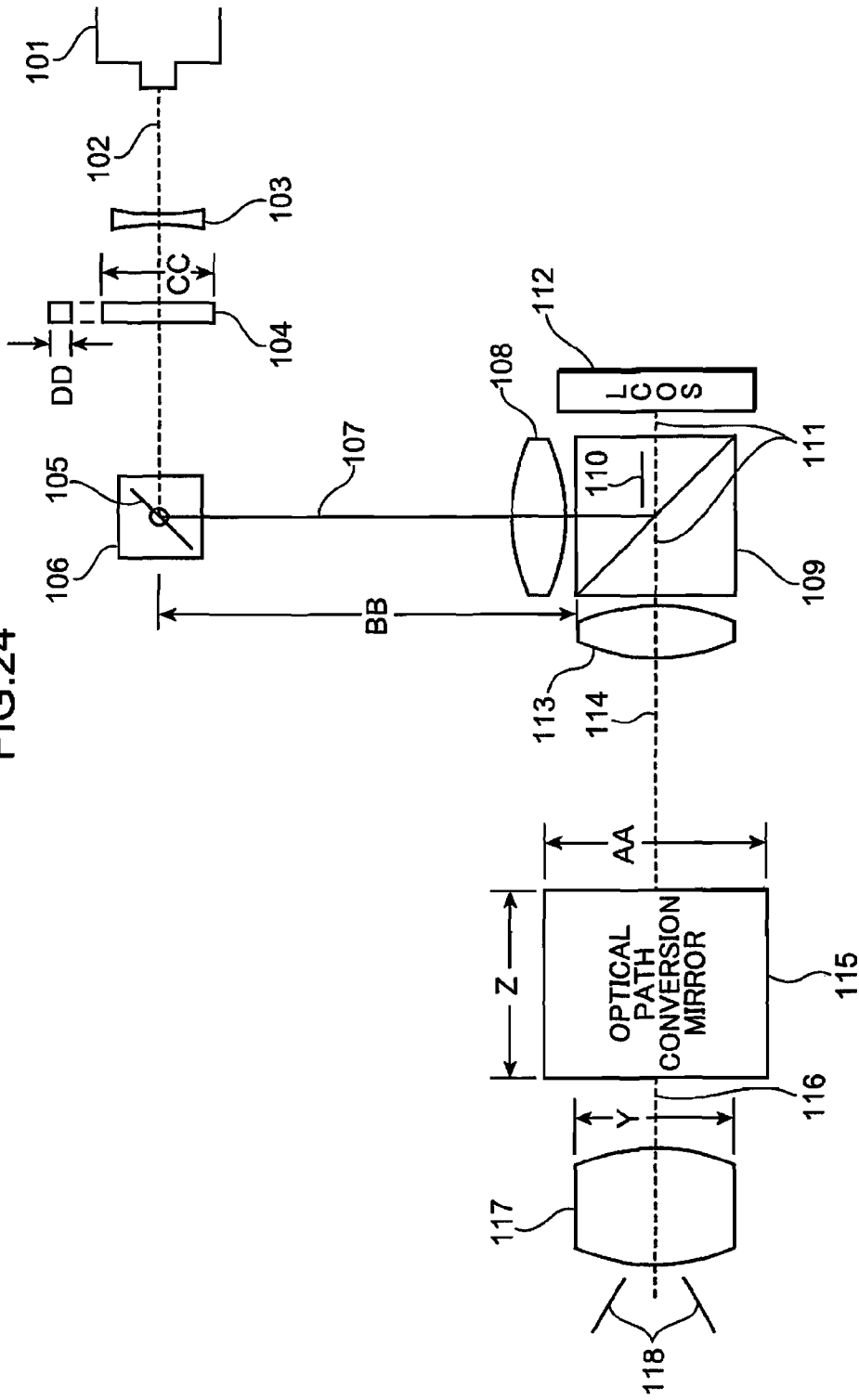
FIG. 24 is a view schematically showing the configuration of a conventional 2D image display apparatus.
Figure 25:
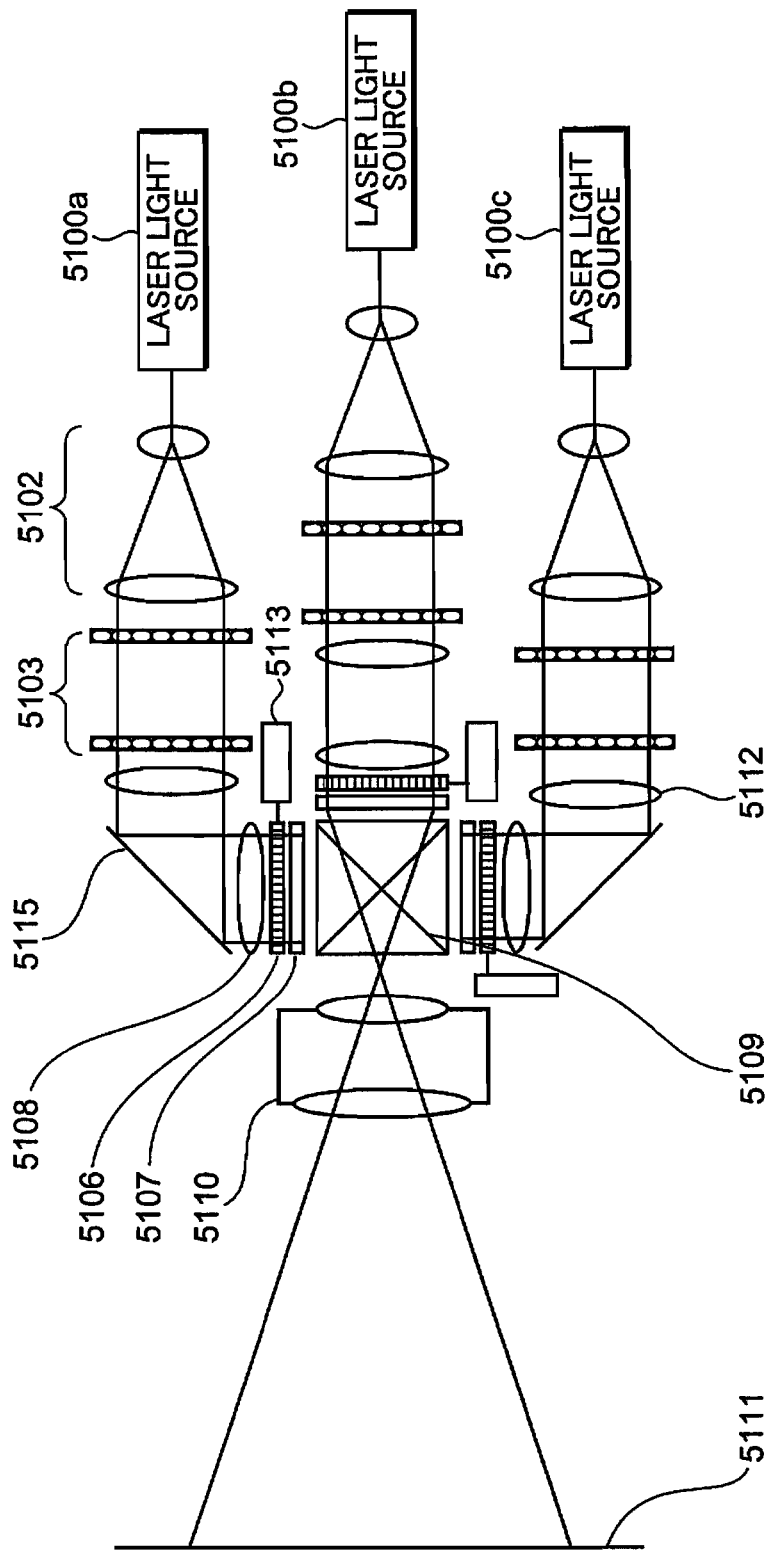
FIG. 25 is a view schematically showing the configuration of another conventional 2D image display apparatus.
Figure 26:
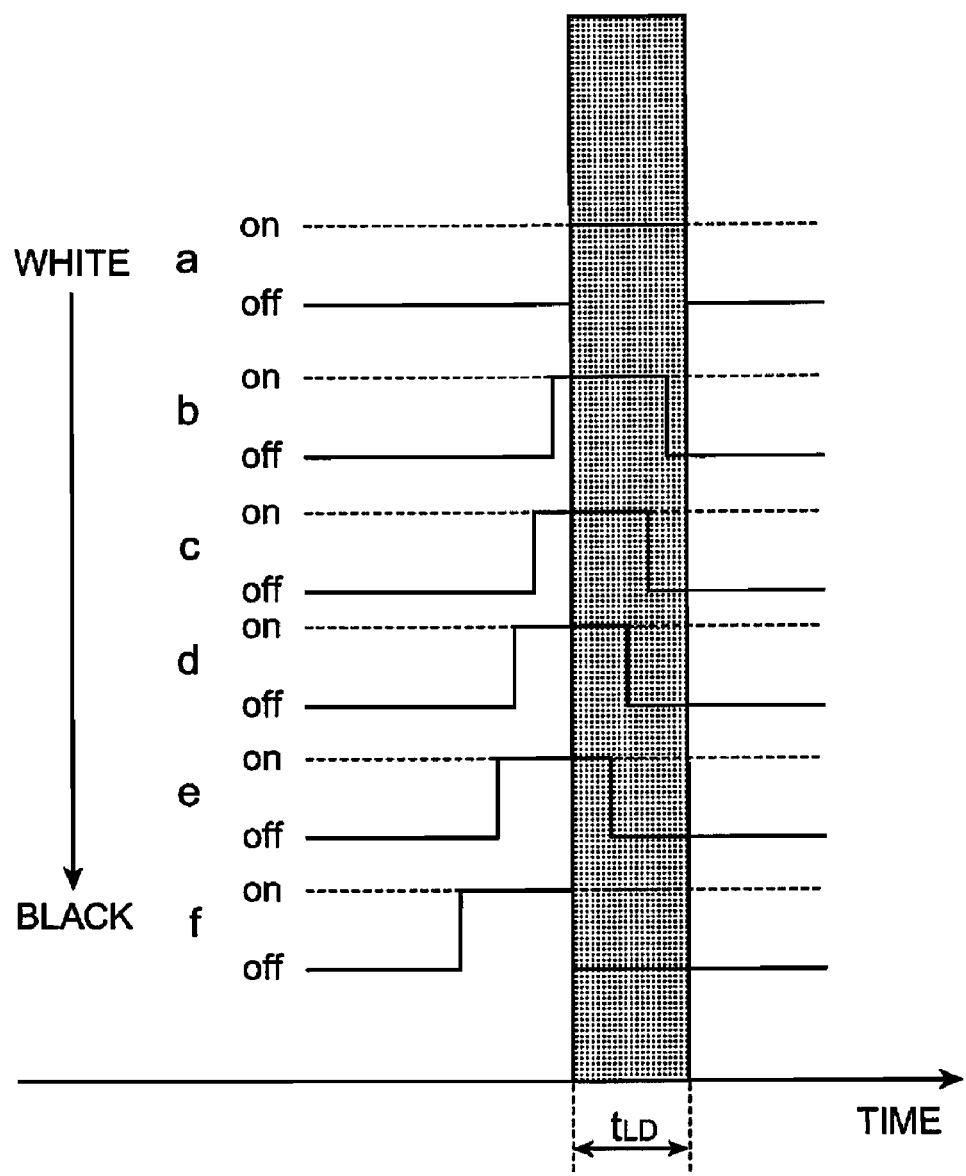
FIG. 26 is a view used to describe the grayscale expression method in a case where an LCOS is used as a spatial light modulator.

Also, in this embodiment, the respective laser light sources 51a, 51b, and 51c are configured to emit laser beams continuously during the lighting period. However, this embodiment is not limited to this configuration. For example, the red laser light source 51a of FIG. 23 is driven in pulsed oscillation during the lighting period. In this case, it is necessary to invert the phase of the lighting timing between the lighting period of the ½ field and the lighting period of the 2/2 field. When configured in this manner, it is possible to invert the scan direction in each lighting period as in the fourth embodiment described above. It is therefore possible to achieve the same effect as that of the fourth embodiment. Further, by driving the laser light source in pulsed oscillation, power consumption can be reduced. It goes without saying that when output power of the laser light source drops, oscillations of the laser light source can be changed to continuous oscillation from pulsed oscillation. Accordingly, the output power from the laser light source can be maintained.

As has been described, according to the fourth embodiment of the invention, not only is it possible to diffuse a laser beam scanned by the scan mirror by irradiating the beam to the spatial light modulator via the diffusing plate, but it is also possible to change the angle of incidence of light that irradiates the respective pixels of the screen from time to time. It is thus possible to reduce the speckle noises of the projected image effectively.

Because the diffused beam has a width, there is no need to expand the amplitude of the beam scan to the full width of the screen. Homogenous illumination on almost the entire surface of the screen is enabled with the amplitude of about 70 to 80% of the full width of the screen. With the configuration as described above, it is possible to realize a compact and simple illumination optical system achieving both homogenization and the effect of reducing the speckle noises.

Further, when the magnification of the driving frequency of the scan mirror is n−0.5 times (n=1, 2, 3, and so on), the scan direction inverts in each lighting period. Hence, one frame is formed as changes in grayscale in the mutually opposite directions resulting from the scan overlap in two fields, which makes it possible to achieve an effect of making the error between the projected image obtained by scanning illumination light and the original image laterally equal and making the error less noticeable through diffusion. In addition, because the error can be reduced at the low driving frequency, it is possible to reduce the vibrations and noises at low power.

An image display apparatus according to an aspect of the invention includes: a laser light source; a beam scan portion that scans a laser beam emitted from the laser light source; a spatial light modulator that spatially digital-modulates the laser beam scanned by the beam scan portion; and a diffusing member that is disposed between the beam scan portion and the spatial light modulator and diffuses the laser beam scanned by the beam scan portion in a scan direction of the beam scan portion, wherein the beam scan portion scans the laser beam so that an image of one frame is formed by a continuous display of plural fields; and a scan timing of the beam scan portion is synchronized with the light emitting timing of the laser light source.

According to the image display of the invention, it possible to realize a compact and simple illumination optical system achieving both homogenization and the effect of reducing the speckle noises.

In the image display apparatus described above, it is preferable that a scan cycle of the beam scan portion, $T_{scan}$, and a light emitting time of the laser light source, $T_{Laser\_ON}$, satisfy an equation expressed as:

$$T_{Laser\_ON}=n \cdot T_{scan}$$

where n is an integer.

According to this configuration, by setting the light emitting time of the laser light source to an integral multiple of the scan cycle of the beam scan portion, it is possible to illuminate the spatial light modulator homogeneously with a laser beam. It is thus possible to display an image at high accuracy without causing a bright line, irregularities in brightness, and contrast deterioration.

In the image display apparatus described above, it is preferable to further include a detection portion that detects an output of the laser light source, and a control portion that controls the output of the laser light source according to a detection value of the detection portion.

According to this configuration, because an output of a laser beam emitted from the laser light source can be understood at high accuracy, it is possible to display an image at a higher degree of accuracy as the light emitting intensity of the laser light source is made homogeneous.

In the image display apparatus described above, it is preferable that the spatial light modulator is a liquid crystal on silicon made of ferroelectric liquid crystals.

According to this configuration, because a laser beam can be modulated digitally at a high speed, it is possible to display an image at a further higher degree of accuracy.

In the image display apparatus described above, it is preferable that the spatial light modulator is a micro electromechanical system element.

According to this configuration, because a laser beam can be modulated digitally at a high speed, it is possible to display an image at a further higher degree of accuracy.

In the image display apparatus described above, it is preferable that an angle of diffusion of the diffusing member is in a range of 3° to 5° both inclusive.

According to this configuration, it is possible to make the angle of scan of the laser scan portion smaller, which can in turn increase a scan rate of the laser scan portion.

In the image display apparatus described above, it is preferable that: the laser light source is a green laser light source; the green laser light source includes a fiber containing a laser activated material and having a fiber grating formed therein, an exciting light source from which exciting light goes incident on the fiber, and a wavelength conversion element that converts a fundamental wave of a laser coming out from the fiber to a higher harmonic; and the higher harmonic outputted from the wavelength conversion element is frequency modulated.

According to this configuration, not only is it possible to increase an output for green light, but it is also possible to stabilize the output intensity of the laser light source within the lighting period.

In the image display apparatus described above, it is preferable that the laser light source emits light after scanning by the beam scan portion starts.

According this configuration, it is possible to prevent a high-intensity laser beam immediately after the light emission from the laser light source from being irradiated onto the spatial light modulator. It is thus possible to suppress damages on the spatial light modulator caused by laser beam irradiation.

In the image display apparatus described above, it is preferable that the laser light source includes three laser light sources defined as a red laser light source, a blue laser light source, and a green laser light source, and that each field is formed by a continuous display of three color fields in red, blue, and green and a display duty of the three color fields is ⅓.

According to this configuration, not only is it possible to invert the scan direction of the laser scan portion in each of the continuous color fields, but it is also possible to invert the scan direction of the laser scan portion between the color fields in the same colors.

In the image display apparatus described above, it is preferable that the number of the plural fields is an even number.

According to this configuration, because a single same frame image is formed by a continuous display of an even number of fields, it is possible to invert the scan direction by the beam scan portion in a reliable manner.

In the image display apparatus described above, it is preferable that the beam scan portion is driven at a resonance frequency.

According to this configuration, because the beam scan portion can be driven in a stable manner, it is possible to suppress the occurrence of vibrations and noises by reducing power consumption.

In the image display apparatus described above, it is preferable that the apparatus is configured in such a manner that when a grayscale image having a grayscale in a direction perpendicular to the scan direction of the beam scan portion is displayed, a change of a pixel value of each pixel forming the grayscale image that results from a scan by the scan portion is compensated for, and that the spatial light modulator spatially digital-modulates the laser beam scanned by the beam scan portion based on a result achieved with the inverse transformation of a tone curve that follows the variation in the pixel value of each pixel forming the grayscale image.

According to this configuration, it is possible to display an image close to the original image to the extent possible.

In the image display apparatus described above, it is preferable that the scan direction of the beam scan portion inverts in order of display of the plural fields as a scan frequency of the beam scan portion, fs, and a light emitting frequency of the laser light source, fi, satisfy an equation expressed as:

$$fs=(n-0.5)fi$$

where n is an integer.

According to this configuration, by increasing the scan frequency of the beam scan portion to be n−0.5 times (n=1, 2, 3, and so on) higher than the light emitting frequency of the laser light source, the scan direction of the beam scan portion inverts in order of display of the plural fields. Hence, one frame is formed as changes in grayscale in the mutually opposite directions resulting from the scan overlap in two fields, which makes the error between an image obtained by scanning illumination light and the original image laterally equal and making the error less noticeable through diffusion when the scan frequency of the beam scan portion.

In the image display apparatus described above, it is preferable to further include a detection portion that detects an output of the laser light source, and a control portion that controls the output of the laser light source according to a detection value of the detection portion.

According to this configuration, because an output of a laser beam emitted from the laser light source can be understood at high accuracy, it is possible to display an image at a higher degree of accuracy as the light emitting intensity of the laser light source is made homogeneous.

In the image display apparatus described above, it is preferable that the spatial light modulator is a liquid crystal on silicon made of ferroelectric liquid crystals.

According to this configuration, because a laser beam can be modulated digitally at a high speed, it is possible to display an image at a further higher degree of accuracy.

In the image display apparatus described above, it is preferable that the spatial light modulator is a micro electromechanical system element.

According to this configuration, because a laser beam can be modulated digitally at a high speed, it is possible to display an image at a further higher degree of accuracy.

In the image display apparatus described above, it is preferable that an angle of diffusion of the diffusing member is in a range of 3° to 5° both inclusive.

According to this configuration, it is possible to make the angle of scan of the laser scan portion smaller, which can in turn increase a scan rate of the laser scan portion.

In the image display apparatus described above, it is preferable that: the laser light source is a green laser light source; the green laser light source includes a fiber containing a laser activated material and having a fiber grating formed therein, an exciting light source from which exciting light goes incident on the fiber, and a wavelength conversion element that converts a fundamental wave of a laser coming out from the fiber to a higher harmonic; and the higher harmonic outputted from the wavelength conversion element is frequency modulated.

According to this configuration, not only is it possible to increase an output for green light, but it is also possible to stabilize the output intensity of the laser light source within the lighting period.

In the image display apparatus described above, it is preferable that the laser light source emits light after scanning by the beam scan portion starts.

According this configuration, it is possible to prevent a high-intensity laser beam immediately after the light emission from the laser light source from being irradiated onto the spatial light modulator. It is thus possible to suppress damages on the spatial light modulator caused by laser beam irradiation.

In the image display apparatus described above, it is preferable that the laser light source includes three laser light sources defined as a red laser light source, a blue laser light source, and a green laser light source, and that each field is formed by a continuous display of three color fields in red, blue, and green and a display duty of the three color fields is ⅓.

According to this configuration, not only is it possible to invert the scan direction of the laser scan portion in each of the continuous color fields, but it is also possible to invert the scan direction of the laser scan portion between the color fields in the same colors.

In the image display apparatus described above, it is preferable that the number of the plural fields is an even number.

According to this configuration, because a single same frame image is formed by a continuous display of an even number of fields, it is possible to invert the scan direction by the beam scan portion in a reliable manner.

In the image display apparatus described above, it is preferable that the beam scan portion is driven at a resonance frequency.

According to this configuration, because the beam scan portion can be driven in a stable manner, it is possible to suppress the occurrence of vibrations and noises by reducing power consumption.

In the image display apparatus described above, it is preferable that the apparatus is configured in such a manner that when a grayscale image having a grayscale in a direction perpendicular to the scan direction of the beam scan portion is displayed, a change of a pixel value of each pixel forming the grayscale image that results from a scan by the scan portion is compensated for, and that the spatial light modulator spatially digital-modulates the laser beam scanned by the beam scan portion based on a result achieved with the inverse transformation of a tone curve that follows the variation in the pixel value of each pixel forming the grayscale image.

According to this configuration, it is possible to display an image close to the original image to the extent possible.

This application is based on Japanese patent applications No. 2006-109491 and No. 2006-307427 filed in Japan, the contents of which are hereby incorporated by references.

As this invention may be embodied in several forms without departing from spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by claims.

What is claimed is:

1. An image display apparatus, comprising:
   a laser light source;
   a beam scan portion that scans a laser beam emitted from the laser light source so that an image of one frame is formed by a continuous display of plural fields;
   a spatial light modulator that spatially digitally-modulates the laser beam scanned by the beam scan portion;
   a modulator controller that is configured to control the spatial light modulator based on an inputted video signal;
   a diffusing member, disposed between the beam scan portion and the spatial light modulator, that diffuses the laser beam scanned by the beam scan portion in a scan direction of the beam scan portion; and
   a control portion that is configured to control emitting of the laser beam from the laser light source and scanning of the beam scan portion so as to synchronize a scan timing of the beam scan portion with a light emitting timing of the laser light source,
   wherein the control portion controls the laser light source and the beam scan portion to cause the laser beam to reciprocate across a display region of the spatial light modulator once, as the beam scan portion scans in one cycle, so that the entire display region of the spatial light modulator is illuminated by the laser beam,
   wherein the control portion controls the laser light source to start the emitting of the laser beam such that the laser beam scanned by the beam scan portion illuminates one end of the display region of the spatial light modulator, and to stop the emitting of the laser beam when the laser beam scanned by the beam scan portion illuminates the one end of the display region of the spatial light modulator after reciprocating across the display region of the spatial light modulator, and
   wherein a scan cycle of the beam scan portion, $T_{scan}$, which is an interval of time required for the laser beam to reciprocate across the display region of the spatial light modulator once, and a light emitting time of the laser light source, $T_{Laser\_ON}$, which is an interval of time between a timing to start the emitting of the laser beam and a timing to stop the emitting of the laser beam, satisfy an equation expressed as: $T_{Laser\_ON} = n \cdot T_{scan}$, where n is an integer.

2. The image display apparatus according to claim 1, further comprising:
   a detection portion that detects an output of the laser light source,
   wherein the control portion controls the output of the laser light source according to a detection value of the detection portion.

3. The image display apparatus according to claim 1, wherein:
   the spatial light modulator is a liquid crystal on silicon made of ferroelectric liquid crystals.

4. The image display apparatus according to claim 1, wherein:
   the spatial light modulator is a micro electro mechanical system element.

5. The image display apparatus according to claim 1, wherein:
   an angle of diffusion of the diffusing member is in a range of 3° to 5° both inclusive.

6. The image display apparatus according to claim 1, wherein:
   the laser light source is a green laser light source including:
   a fiber containing a laser activated material and having a fiber grating formed therein;
   an exciting light source from which exciting light goes incident on the fiber; and
   a wavelength conversion element that converts a fundamental wave of a laser coming out from the fiber to a higher harmonic,
   wherein the higher harmonic outputted from the wavelength conversion element is frequency modulated.

7. The image display apparatus according to claim 1, wherein:
the laser light source emits light after scanning by the beam scan portion starts.

8. The image display apparatus according to claim 1, wherein:
the laser light source includes three laser light sources defined as a red laser light source, a blue laser light source, and a green laser light source; and
each field is formed by a continuous display of three color fields in red, blue, and green and a display duty of the three color fields is ⅓.

9. The image display apparatus according to claim 1, wherein:
the number of the plural fields is an even number.

10. The image display apparatus according to claim 1, wherein:
the beam scan portion is driven at a resonance frequency.

11. The image display apparatus according to claim 1, wherein:
the apparatus is configured in such a manner that when a grayscale image having a grayscale in a direction perpendicular to the scan direction of the beam scan portion is displayed, a variation in a pixel value of each pixel forming the grayscale image that results from a scan by the scan portion is compensated for.

12. The image display apparatus according to claim 11, wherein:
the spatial light modulator spatially digitally-modulates the laser beam scanned by the beam scan portion based on a result achieved with the inverse transformation of a tone curve that follows the variation in the pixel value of each pixel forming the grayscale image.

13. An image display apparatus, comprising:
a laser light source;
a beam scan portion that scans a laser beam emitted from the laser light source, so that an image of one frame is formed by a continuous display of plural fields;
a spatial light modulator that spatially digitally-modulates the laser beam scanned by the beam scan portion;
a modulator controller that is configured to control the spatial light modulator based on an inputted video signal;
a diffusing member, disposed between the beam scan portion and the spatial light modulator, that diffuses the laser beam scanned by the beam scan portion in a scan direction of the beam scan portion; and
a control portion that is configured to control emitting of the laser beam from the laser light source and scanning of the beam scan portion so as to synchronize a scan timing of the beam scan portion with a light emitting timing of the laser light source,
wherein the control portion is configured to control the scan direction of the beam scan portion so as to invert an order of display of the plural fields, as a scan frequency of the beam scan portion, fs, and a light emitting frequency of the laser light source, fi, satisfy an equation expressed as: $fs=(n-0.5)fi$, where n is an integer,
wherein the control portion is configured to control the laser light source and the beam scan portion to cause the laser beam to scan a display region of the spatial light modulator one way from one end to an opposite end of the display region as the beam scan portion scans in half cycle, and
wherein the control portion is configured to cause the laser light source to start emitting the laser beam such that the laser beam scanned by the beam scan portion illuminates the one end of the display region of the spatial light modulator, and to stop emitting the laser beam when the laser beam scanned by the beam scan portion illuminates the opposite end of the display region of the spatial light modulator.

14. The image display apparatus according to claim 13, further comprising:
a detection portion that detects an output of the laser light source,
wherein the control portion controls the output of the laser light source according to a detection value of the detection portion.

15. The image display apparatus according to claim 13, wherein:
the spatial light modulator is a liquid crystal on silicon made of ferroelectric liquid crystals.

16. The image display apparatus according to claim 13, wherein:
the spatial light modulator is a micro electro mechanical system element.

17. The image display apparatus according to claim 13, wherein:
an angle of diffusion of the diffusing member is in a range of 3° to 5° both inclusive.

18. The image display apparatus according to claim 13, wherein:
the laser light source is a green laser light source including:
a fiber containing a laser activated material and having a fiber grating formed therein;
an exciting light source from which exciting light goes incident on the fiber; and
a wavelength conversion element that converts a fundamental wave of a laser coming out from the fiber to a higher harmonic,
wherein the higher harmonic outputted from the wavelength conversion element is frequency modulated.

19. The image display apparatus according to claim 13, wherein:
the laser light source emits light after scanning by the beam scan portion starts.

20. The image display apparatus according to claim 13, wherein:
the laser light source includes three laser light sources defined as a red laser light source, a blue laser light source, and a green laser light source; and
each field is formed by a continuous display of three color fields in red, blue, and green and a display duty of the three color fields is ⅓.

21. The image display apparatus according to claim 13, wherein:
the number of the plural fields is an even number.

22. The image display apparatus according to claim 13, wherein:
the beam scan portion is driven at a resonance frequency.

23. The image display apparatus according to claim 13, wherein:
the apparatus is configured in such a manner that when a grayscale image having a grayscale in a direction perpendicular to the scan direction of the beam scan portion is displayed, a change of a pixel value of each pixel forming the grayscale image that results from a scan by the scan portion is compensated for.

24. The image display apparatus according to claim 23, wherein:
the spatial light modulator spatially digitally-modulates the laser beam scanned by the beam scan portion based on a result achieved with the inverse transformation of a tone curve that follows the variation in the pixel value of each pixel forming the grayscale image.

* * * * *